(12) United States Patent
Yu et al.

(10) Patent No.: US 10,712,224 B2
(45) Date of Patent: Jul. 14, 2020

(54) INTEGRATED OPTICAL SURVEILLANCE SYSTEMS FOR CHANGES IN PHYSICAL PARAMETERS

(71) Applicant: THE TRUSTEES OF COLUMBIA UNIVERSITY IN THE CITY OF NEW YORK, New York, NY (US)

(72) Inventors: Nanfang Yu, Fort Lee, NJ (US); Meng Tian, Fort Lee, NJ (US)

(73) Assignee: THE TRUSTEES OF COLUMBIA UNIVERSITY IN THE CITY OF NEW YORK, New York, NY (US)

( * ) Notice: Subject to any disclaimer, the term of this patent is extended or adjusted under 35 U.S.C. 154(b) by 191 days.

(21) Appl. No.: 15/985,370

(22) Filed: May 21, 2018

(65) Prior Publication Data
US 2018/0335362 A1 Nov. 22, 2018

Related U.S. Application Data

(60) Provisional application No. 62/508,669, filed on May 19, 2017.

(51) Int. Cl.
*G01M 3/04* (2006.01)
*G01M 3/38* (2006.01)
(Continued)

(52) U.S. Cl.
CPC .............. *G01M 3/04* (2013.01); *G01K 11/32* (2013.01); *G01L 1/242* (2013.01); *G01M 3/38* (2013.01)

(58) Field of Classification Search
CPC ................................ G01M 3/047; G02B 6/262
See application file for complete search history.

(56) References Cited

U.S. PATENT DOCUMENTS 4,195,907 A * 4/1980 Zamja .................... G02B 6/001
362/556
4,221,962 A * 9/1980 Black .................... G01M 3/047
250/227.25
(Continued)

FOREIGN PATENT DOCUMENTS

EP         0635123 B1 * 3/1997 .......... G01M 11/083
WO    WO-02088656 A1 * 11/2002 ............ G01M 3/047
(Continued)

OTHER PUBLICATIONS

"Continuous automated Rooftop Leak Detection," Waterproof! Magazine. Fall 2016.
(Continued)

*Primary Examiner* — David A. Rogers
(74) *Attorney, Agent, or Firm* — Baker Botts L.L.P.

(57) ABSTRACT

Systems and methods for detecting a change in at least one physical parameter of a target illuminated by electromagnetic radiation are disclosed herein. The system includes one or more optical fibers, an optical switch, and a photo detector. The optical fiber switch can transmit at least a portion of the electromagnetic radiation into the one or more optical fibers. The optical fibers can have a plurality of sensor nodes. The sensor nodes can induce an interaction between the change in the at least one physical parameter and the transmitted electromagnetic radiation to generate an optical signal. The photo detector can be connected to the one or more optical fibers and measure the optical signal.

17 Claims, 28 Drawing Sheets

(51) Int. Cl.
*G01L 1/24* (2006.01)
*G01K 11/32* (2006.01)

(56) References Cited

U.S. PATENT DOCUMENTS

| | | | | |
|---|---|---|---|---|
| 4,367,460 A * | 1/1983 | Hodara | ............... | G08B 13/126 250/215 |
| 4,386,269 A * | 5/1983 | Murphy | ............... | G01M 3/047 250/227.25 |
| 4,538,527 A * | 9/1985 | Kitchen | ............... | G08B 13/126 109/21 |
| 4,598,273 A | 7/1986 | Bryan, Jr. et al. | | |
| 4,603,252 A * | 7/1986 | Malek | ............... | B29C 37/00 250/227.14 |
| 4,634,856 A * | 1/1987 | Kirkham | ............... | G01N 21/431 250/227.25 |
| 4,772,092 A * | 9/1988 | Hofer | ............... | G01M 11/086 385/13 |
| 4,867,820 A * | 9/1989 | Jacobson | ............... | G08B 13/04 156/101 |
| 5,005,005 A * | 4/1991 | Brossia | ............... | B64D 15/20 250/573 |
| 5,072,617 A * | 12/1991 | Weiss | ............... | G01F 23/164 73/293 |
| 5,081,422 A | 1/1992 | Shih | | |
| 5,109,442 A * | 4/1992 | Klainer | ............... | G01N 21/7703 210/500.25 |
| 5,138,153 A * | 8/1992 | Gergely | ............... | G01M 3/047 250/227.18 |
| 5,398,296 A * | 3/1995 | Lin | ............... | G02B 6/14 385/140 |
| 5,440,927 A | 8/1995 | Chu et al. | | |
| 5,567,932 A * | 10/1996 | Staller | ............... | G01M 3/38 250/227.14 |
| 5,627,921 A * | 5/1997 | Lidgard | ............... | C03B 37/01211 250/227.14 |
| 5,748,092 A | 5/1998 | Arsenault et al. | | |
| 5,828,798 A * | 10/1998 | Hopenfeld | ............... | G01N 21/7703 385/12 |
| 6,016,714 A * | 1/2000 | Smith | ............... | B09B 1/00 588/260 |
| 6,377,181 B1 | 4/2002 | Kroll et al. | | |
| 6,582,658 B1 * | 6/2003 | Hood | ............... | G01N 21/81 422/401 |
| 6,600,149 B2 * | 7/2003 | Schulz | ............... | G01M 3/165 250/227.14 |
| 6,648,552 B1 * | 11/2003 | Smith | ............... | B09B 1/00 405/129.5 |
| 6,753,520 B2 * | 6/2004 | Spirin | ............... | G01K 11/32 250/227.11 |
| 6,795,635 B1 * | 9/2004 | Fajardo | ............... | C03B 37/0122 385/100 |
| 6,948,882 B2 * | 9/2005 | Smith | ............... | B09B 1/00 405/129.5 |
| 6,965,708 B2 * | 11/2005 | Luo | ............... | G01N 21/774 385/12 |
| 6,995,676 B2 | 2/2006 | Amacher | | |
| 7,037,554 B2 * | 5/2006 | Tao | ............... | G01N 15/06 427/163.1 |
| 7,224,872 B2 * | 5/2007 | Goldner | ............... | G01H 9/004 385/100 |
| 7,706,641 B2 * | 4/2010 | Murphy | ............... | H04B 10/85 385/12 |
| 7,773,835 B2 * | 8/2010 | Yogun | ............... | C03C 25/105 385/12 |
| 7,843,338 B2 * | 11/2010 | Zhou | ............... | G08B 13/1445 340/550 |
| 7,856,157 B2 * | 12/2010 | Beinhocker | ............... | F17D 5/00 385/12 |
| 7,924,166 B2 * | 4/2011 | Beinhocker | ............... | G01M 3/22 340/541 |
| 8,085,397 B2 * | 12/2011 | Haran | ............... | G01J 3/02 356/326 |
| 8,207,861 B2 * | 6/2012 | Beinhocker | ............... | G01M 3/22 250/227.15 |
| 8,285,100 B2 * | 10/2012 | Dong | ............... | C03B 37/01211 385/11 |
| 8,344,885 B2 * | 1/2013 | Smith | ............... | B65D 90/00 340/10.1 |
| 8,384,886 B2 * | 2/2013 | Richardson | ............... | G01K 11/32 356/73.1 |
| 8,566,051 B2 * | 10/2013 | Gunness | ............... | E04D 13/006 324/444 |
| 8,705,924 B2 * | 4/2014 | Dong | ............... | C03B 37/01211 385/11 |
| 8,731,342 B2 * | 5/2014 | Yang | ............... | H04B 10/0771 385/12 |
| 8,964,186 B2 * | 2/2015 | Cheim | ............... | G01N 21/01 356/445 |
| 9,157,828 B2 * | 10/2015 | Jaman | ............... | G01N 27/048 |
| 9,222,877 B2 | 12/2015 | Song et al. | | |
| 9,244,030 B2 * | 1/2016 | Vokey | ............... | G01N 27/20 |
| 9,341,540 B2 * | 5/2016 | Gunness | ............... | G01M 3/40 |
| 9,373,234 B1 * | 6/2016 | Beinhocker | ............... | G08B 13/126 |
| 9,500,554 B2 * | 11/2016 | Kulkarni | ............... | G01M 3/002 |
| 10,488,293 B1 * | 11/2019 | Mills | ............... | G01M 3/16 |
| 2003/0052256 A1 * | 3/2003 | Spirin | ............... | G01K 11/32 250/227.11 |
| 2007/0116402 A1 * | 5/2007 | Slade | ............... | G01N 21/81 385/12 |
| 2007/0289635 A1 | 12/2007 | Ghazarian et al. | | |
| 2008/0231719 A1 | 9/2008 | Benson et al. | | |
| 2009/0115607 A1 * | 5/2009 | Beinhocker | ............... | G08B 13/126 340/541 |
| 2009/0129722 A1 * | 5/2009 | Hao | ............... | G01D 5/35383 385/13 |
| 2010/0045471 A1 | 2/2010 | Meyers | | |
| 2010/0289651 A1 * | 11/2010 | Beinhocker | ............... | G01M 3/22 340/600 |
| 2012/0177319 A1 * | 7/2012 | Alemohammad | ............... | C03C 25/106 385/12 |
| 2012/0281944 A1 * | 11/2012 | Yang | ............... | H04B 10/0771 385/12 |
| 2014/0102190 A1 * | 4/2014 | Song | ............... | G01M 3/047 73/335.01 |
| 2015/0259923 A1 * | 9/2015 | Sleeman | ............... | E04D 13/006 52/173.1 |

FOREIGN PATENT DOCUMENTS

| | | | | |
|---|---|---|---|---|
| WO | WO-03046500 A1 * | 6/2003 | ............ | G01M 3/04 |
| WO | WO-2009158630 A1 * | 12/2009 | ............ | G01M 3/047 |

OTHER PUBLICATIONS

Amnon Yariv, "Optical Electronics in Modern Communications," 5*th* ed., Oxford University Press, 1997 (Table of Contents).

Healy et al., "Development of an Optical Fiber-Based Moisture Sensor for Building Envelopes," Proceedings of the 24th Air Infiltration and Ventilation Centre (AIVC), Conference, pp. 277-282, Oct. 2003.

Ho et al., "A fiber Bragg grating sensor for detection of liquid water in concrete structures," Smart Materials and Structures, 22:055012, 9 pages (2013).

Marchettini et al., "The Sustainable City IX: Urban Regeneration and Sustainability," vol. I, WIT Press. 2014 (Table of Contents).

Wang et al., "Integrated high-quality factor lithium niobite microdisk resonators," Optics Express 22(25):30924-30933 (2014).

* cited by examiner

Figure 21E

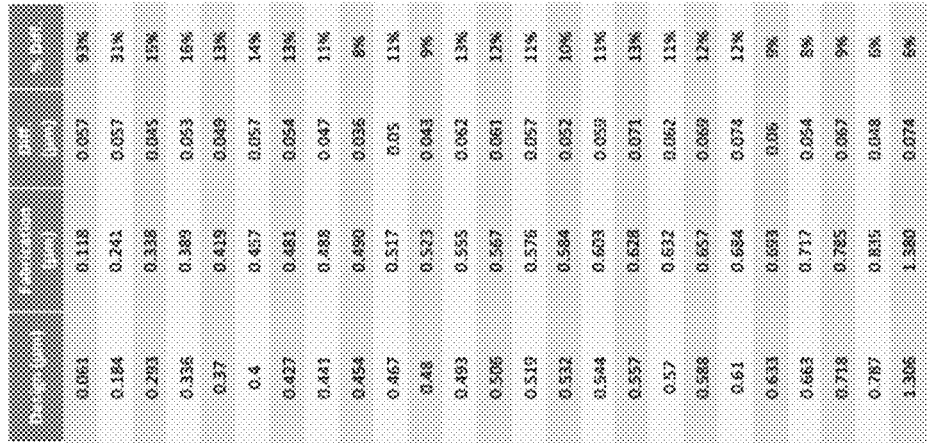
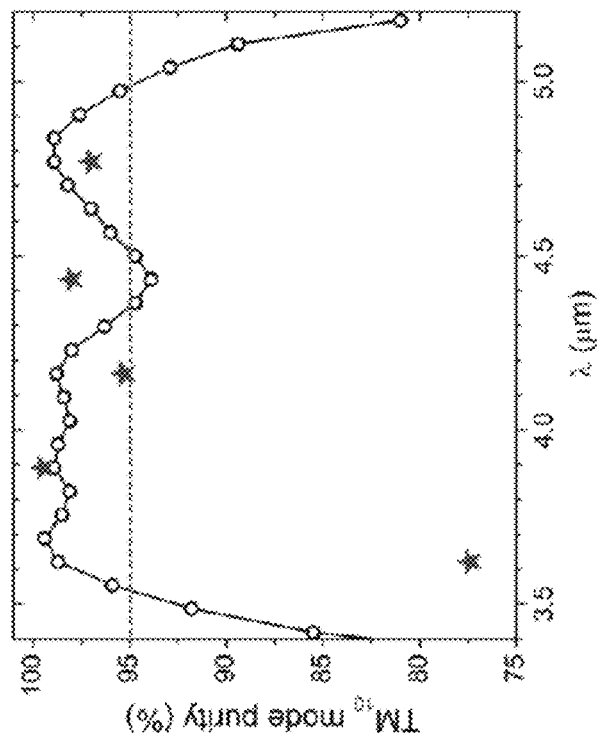
Figure 22A
Figure 22B

 Figure 23A  Figure 23C  Figure 23E  Figure 23G
Figure 23B Figure 23D Figure 23F Figure 23H

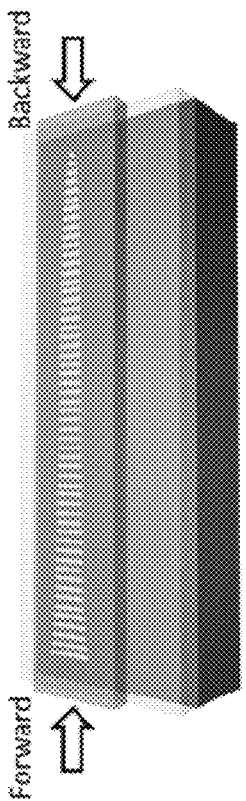
Figure 24A
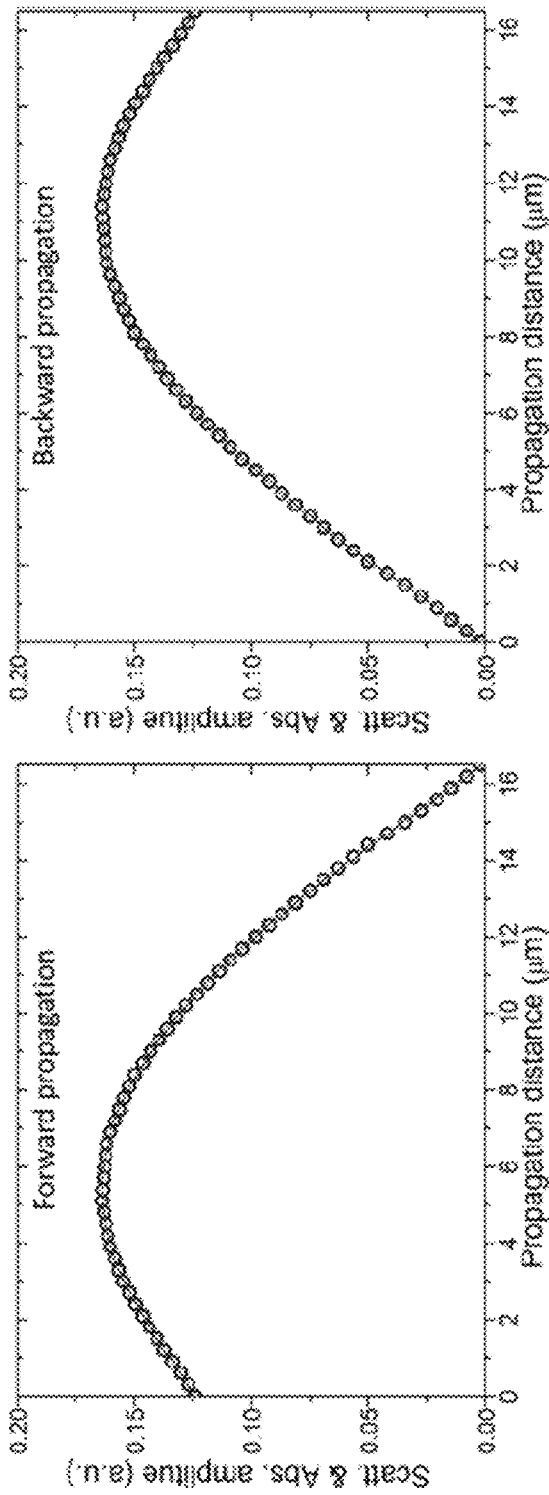
Figure 24B
Figure 24C

INTEGRATED OPTICAL SURVEILLANCE SYSTEMS FOR CHANGES IN PHYSICAL PARAMETERS

CROSS-REFERENCE TO RELATED APPLICATIONS

This application claims priority to U.S. Provisional Application Ser. No. 62/508,669, filed on May 19, 2017, which is incorporated by reference herein in its entirety.

NOTICE OF GOVERNMENT SUPPORT

This invention was made with government support under Contract Number 29750 awarded by the New York State Energy Research and Development Authority. The government has certain rights in the invention.

BACKGROUND

Infrastructure damage due to roof leakage and other structural deterioration can costs homeowners significant amount of money annually. By some estimates, up to 40% of flat roofs develop problems within one year of installation due to leakage. While certain photonic integrated circuits can offer a platform for chemical and physical sensing challenges exist at the device level that prevent reliable large-scale system integration, including miniaturizing device footprint, increasing device operation bandwidth and robustness, and reducing device insertion losses.

Certain electronic leak detection technologies, which can identify breaches by monitoring electric fields set up above and below surface of the waterproofing membrane, are used to detect roof leaks. However, these technologies can require the installation of a conductive framework, such as a stainless steel or aluminum mesh, which can be difficult to install and increase the risk of puncture or other damage to the waterproofing membrane.

Accordingly, there remains a need to improve systems and methods for automated and continuous leak monitoring which can help locating breaches and monitoring building quality without significant additional effort or cost.

SUMMARY

The disclosed subject matter provides systems and methods for detecting a change in at least one physical parameter of a target illuminated by electromagnetic radiation.

In certain embodiments, an exemplary surveillance system can include one or more optical fibers, an optical switch, and a photo detector. The optical fiber switch can transmit at least a portion of the electromagnetic radiation into the one or more optical fibers. The optical fibers can have a plurality of sensor nodes thereon. The sensor nodes can induce an interaction between the change in the at least one physical parameter and the transmitted electromagnetic radiation to generate an optical signal. The photo detector can be connected to the one or more optical fibers and measure the optical signal.

In certain embodiments, the sensor nodes can include a plurality of optical nano-antennas. The nano-antennas can draw the transmitted electromagnetic radiation to a surface of each of the one or more optical fibers to generate modified electromagnetic radiation. Furthermore, the nano-antennas can scatter the modified electromagnetic radiation into a corresponding one of the one or more optical fibers to form the optical signal. In some embodiments, the interaction between the change in the at least one physical parameter and the transmitted electromagnetic radiation can be induced by a size, a length, and/or an orientation of the plurality of optical nano-antennas.

In certain embodiments, the plurality of sensor nodes can change a mode of the one or more optical fibers. For example, the mode can include one or more transverse electric modes and one or more transverse magnetic modes. In some embodiments, the sensor nodes can be a tapered optical fiber, an optical fiber having one or more notches, an optical fiber having a gap of a size, an optical fiber configured as an optical nano-antenna, or a locally doped optical fiber. A sensitivity of the surveillance system can correspond to a number of the one or more of a number of notches, a size of the gap, a configuration of the antenna, and/or dopants selected for the locally doped optical fiber.

In certain embodiments, the surveillance system can further include a communications channel. The communication channel can be coupled to the photo detector and communicate the optical signal to one or more devices. In some embodiments, the surveillance system also can include a device which can be communicatively coupled to the communications channel. The device can receive the optical signal and identify a location of the target.

In certain embodiments, the electromagnetic radiation can be a radio wave, a microwave, infrared radiation, laser, light, and ultraviolet radiation. In some embodiments, the parameter change can include a water leak, a gas leak, and/or a temperature change.

In certain embodiments, the disclosed subject matter provides methods for detecting a change in at least one physical parameter of a target illuminated by electromagnetic radiation. An example method can include embedding one or more optical fibers in an architecture, transmitting the electromagnetic radiation into the one or more optical fibers, and detecting an optical signal. The optical fibers can include a plurality of sensor nodes which can induce an interaction between the parameter change and the transmitted electromagnetic radiation to generate the optical signal. In some embodiments, the architecture can be a roof, a road, a ceiling, or a wall. In non-limiting embodiments, the change can include a water leak, a gas leak, and/or a temperature change.

In certain embodiments, the sensor nodes can alter the transmitted electromagnetic radiation responsive to the interaction by inducing an optical decay and/or a temporal optical power change of the transmitted electromagnetic radiation. In some embodiments, the electromagnetic radiation can match with an absorption bandwidth of the change in the at least one physical parameter.

In certain embodiments, the method can further include communicating the optical signal. In some embodiments, the method can include determining a location of the target by tracing the optical signal. In non-limiting embodiments, the method can also include modifying a distribution of the sensor nodes to adjust sensitivity.

BRIEF DESCRIPTION OF THE DRAWINGS

Further features and advantages of the present disclosure will become apparent from the following detailed description taken in conjunction with the accompanying figures showing illustrative embodiments of the present disclosure, in which:

FIG. 21E provides plots of phase and amplitude of scattered light from Si nanorod antennas located on a LiNbO3 substrate as a function of the antenna length.

FIG. 22A provides plots illustrating purity of the converted $TM1_0$ mode in the mid-infrared $TE_{00}$-to-$TM_{10}$ mode converter. FIG. 22B provides data showing comparison of designed antenna lengths and lengths of fabricated antennas.

FIG. 23 provides selective couplings between waveguide modes by engineering the "form factor" of the antenna structure.

FIG. 24A provides a schematic illustration of the device supporting asymmetric mode coupling in waveguides. FIG. 24B provides plots of antenna scattering/absorption amplitude as function of propagation distance in the forward direction. FIG. 24C provides plots of antenna scattering/absorption amplitude as function of propagation distance in the back direction.

Figure 1:
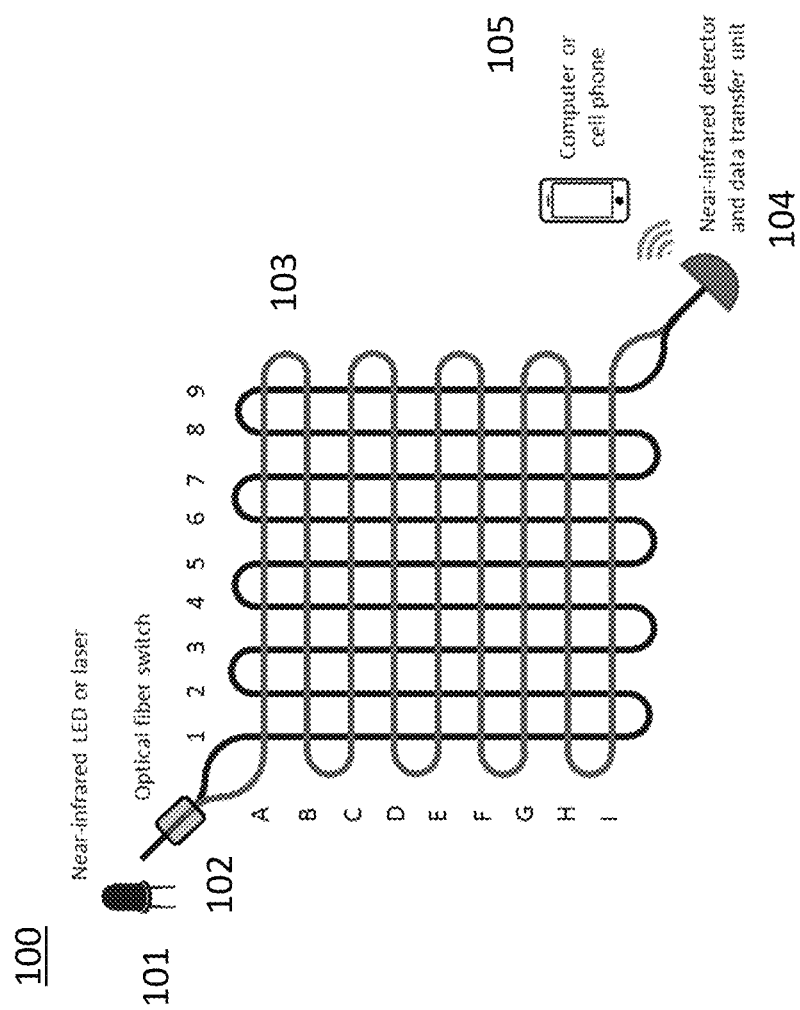
FIG. 1 is a schematic illustration of an exemplary surveillance system in accordance with the present disclosure.

Throughout the figures, the same reference numerals and characters, unless otherwise stated, are used to denote like features, elements, components or portions of the illustrated embodiments. Moreover, while the present disclosure will now be described in detail with reference to the figures, it is done so in connection with the illustrative embodiments.

DETAILED DESCRIPTION

Techniques for detecting a change in at least one physical parameter of a target using a surveillance system are disclosed herein. The disclosed subject matter can monitor and locate minor or progressive changes using optical fibers as a sensor for physical parameters.

In certain embodiments, the disclosed subject matter provides a surveillance system for detecting a change in at least one physical parameter of a target illuminated by electromagnetic radiation. For the purpose of illustration and not limitation, FIG. 1 provides an exemplary surveillance system 100. The surveillance system can include an electromagnetic source 101 and an optical fiber switch 102, one or more optical fibers 103, a photo detector 104, and a device 105 that receives, stores collected data and conducts data analysis.

In certain embodiments, the disclosed subject matter provides an electromagnetic source for providing an electromagnetic radiation. The target can be illuminated by the electromagnetic radiation (e.g., a radio wave, a microwave, infrared radiation, light, ultraviolet radiation, and laser radiation). In some embodiments, the selection of the electromagnetic source and the electromagnetic radiation can be based on the target. An emission bandwidth of the electromagnetic radiation can match with an absorption bandwidth of the change in the at least one physical parameter. For example, when the target (e.g., water) has an absorption peak near $\lambda=1.5$ μm, electromagnetic radiation (e.g., near infrared LED or laser) emitting at $\lambda=1.55$ μm can be selected for the surveillance system.

In certain embodiments, the disclosed subject matter provides an optical fiber switch. The optical fiber switch can transmit at least a portion of the electromagnetic radiation into the one or more optical fibers. For example, as shown in FIG. 1, a 1×2 optical fiber switch can transmit couple light into one optical fiber. After the photo detector conduct one measurement of light transmitted through the fiber, the switch can then couple light into the other optical fiber for the photo detector to make a second measurement. The optical switch can regularly perform such operation to check the optical transmission through the one or more optical fibers. In some embodiments, the optical fiber switch can include a multiport switch and a multiplexer switch.

In certain embodiments, the disclosed subject matter provides an optical fiber for detecting a change in physical parameters of a target. The optical fiber can have a plurality of sensor nodes thereon for the detection. Each of the sensor nodes can induce an interaction between the change in the at least one physical parameter and the transmitted electromagnetic radiation to thereby generate an optical signal. For example, as shown in FIG. 1, the horizontally oriented fiber can be divided into multiple sections (A, B, C . . . ) and the vertically oriented fiber also can be divided into many sections (1, 2, 3 . . . ). Each section on one fiber can be decorated with a certain type of sensor nodes. The sensor node can alter the transmitted optical signal upon stimulation by the target to be detected (e.g., leaked water). Such alteration can be a certain amount of decay to the strength of the transmitted optical signal or a certain temporal variation to the transmitted signal.

Figure 2:
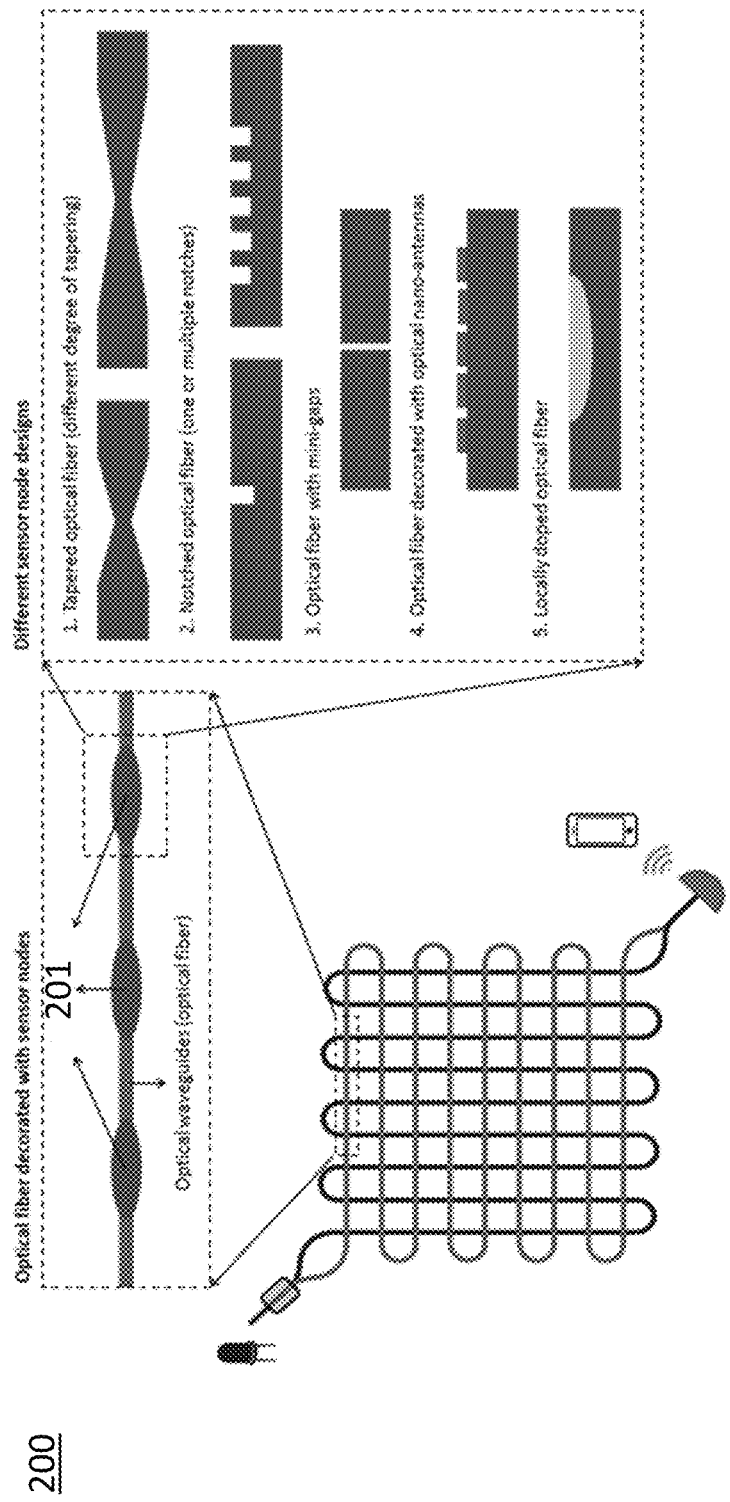
FIG. 2 is an illustration of an exemplary optical fiber decorated with sensor nodes. Sensor nodes can be a tapered optical fiber segment, a notched optical fiber segment, a segment of fiber with a mini-gap, a segment of fiber decorated with optical antennas, or a segment of fiber doped with certain dopants.

In certain embodiments, the optical fiber can have a different type of sensor nodes. For example, as shown in FIG. 2, the sensor node can be a tapered optical fiber, an optical fiber having one or more notches, an optical fiber having a gap, an optical fiber having one or more optical nano-antennas, and a locally doped optical fiber. The tapered optical fiber can have different degrees of tapering. In some embodiments, the design of the nodes can be modified for adjusting sensitivity of the surveillance system. For example, longer taper can allow an improved contact between target and light and thus a larger change to transmitted light. The optical fiber having one or more notches can have different number of notches. The amount of optical decay can be positively correlated with the number of notches and nano-antennas. In non-limiting embodiments, the optical fiber segment can be doped with different amount of dopants. Higher doping level can bring more light to the surface of the optical fiber to interact with the target and induce a larger decay of optical signal.

Figure 3:
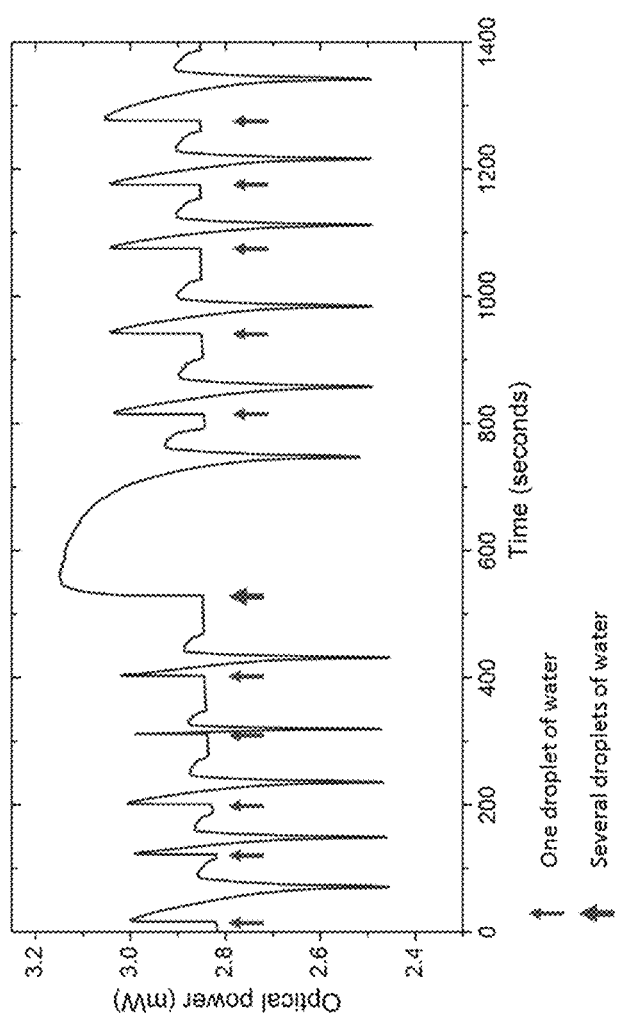
FIG. 3 provides optical power plots illustrating exemplary performance of the surveillance system with optical fibers with a miniature gap.
Figure 4:
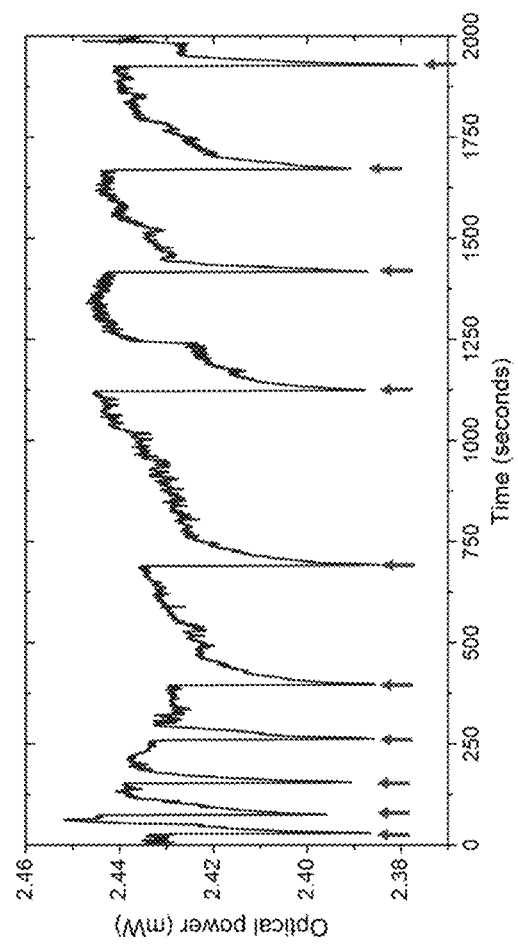
FIG. 4 provides optical power plots illustrating exemplary performance of the surveillance system with tapered optical fibers

In certain embodiments, the surveillance system can detect a change in at least one physical parameter of a target in a dose-dependent manner. As embodied herein FIG. 3 provides an exemplary plot illustrating performance of a surveillance system based on an optical fiber integrated with a gap. After a droplet of water, each wetting and drying process of water leads to a characteristic transmitted optical signal (a large enhancement to transmission, followed by a large decrease in transmission, followed by a small increase to transmission). Several droplets of water induce different changes to the transmitted optical signal compared to one droplet of water. The performance of a surveillance system based on a tapered optical fiber are shown in FIG. 4. Similar to the system with the optical fiber with a gap, the surveillance system with tapered optical fibers can perform a dose-dependent measurement of a target.

Figure 5:
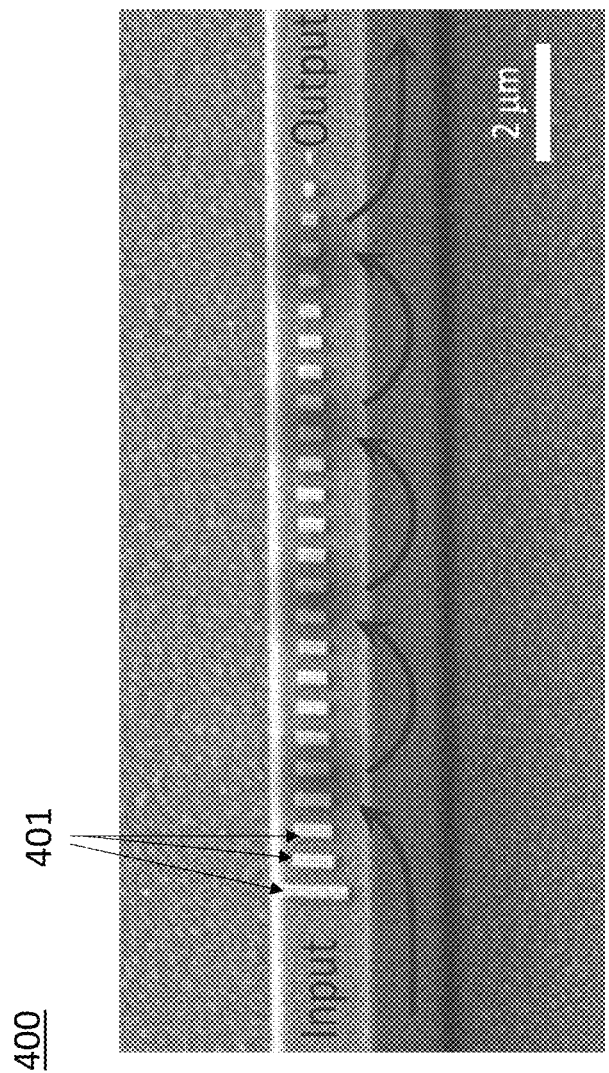
FIG. 5 is a schematic illustration of the optical fiber with optical antennas showing that input light is pulled by optical nano-antennas to the surface of the waveguide where light-chemical interactions occur.
Figure 6A:
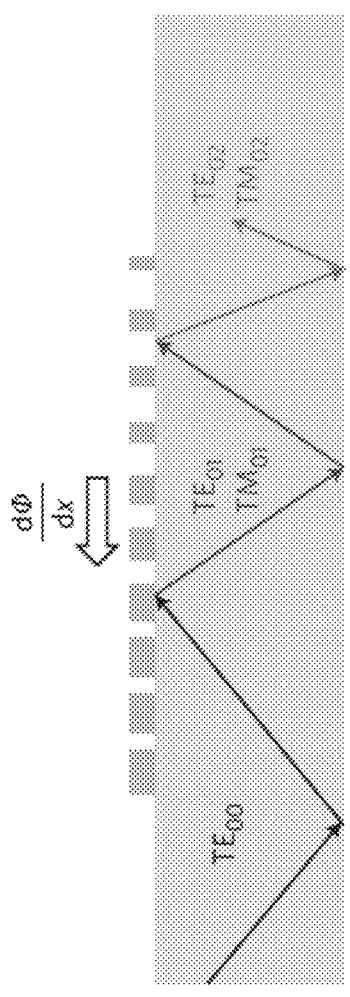
FIG. 6 provides schematic illustrations of the optical fiber showing asymmetric waveguide mode couplings (A) in the forward propagation direction and (B) in the backward propagation direction.
Figure 6B:
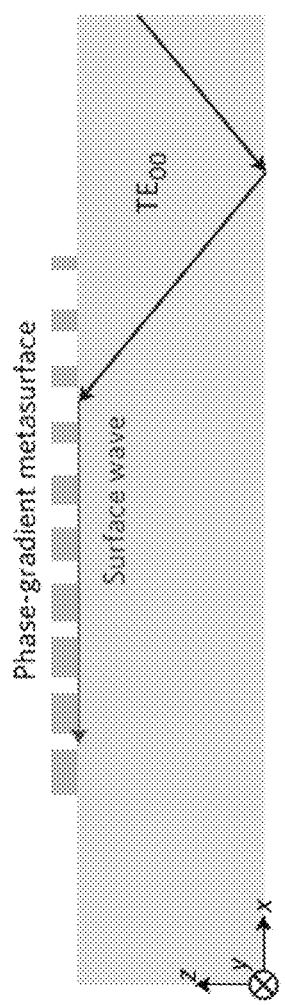

In certain embodiments, the optical fiber can include a plurality of optical nano-antennas. As shown in FIG. 5, each of the nano-antennas can draw the transmitted electromagnetic radiation to a surface of the optical fiber to generate modified electromagnetic radiation and scatter the modified electromagnetic radiation into a corresponding one of the one or more optical fibers to form the optical signal. In some embodiments, the interaction between the change in the at least one physical parameter and the transmitted electromagnetic radiation can be induced by selecting one or more of a size, a length, and/or an orientation of the plurality of optical nano-antennas. As shown in FIGS. 6 and 7, the transmitted electromagnetic radiation can be controlled by optical nano-antennas patterned on the top surface of an optical fiber. The optical nano-antennas can allow asymmetric coupling of waveguide modes: when an incident waveguide mode propagates against a unidirectional effective wavevector keff, the bending angle of its wavevector can increase, which corresponds to coupling from lower-order into higher-order waveguide modes (FIG. 6A); conversely, when an incident waveguide mode propagates along keff, a higher-order waveguide mode is converted to a lower-order mode. If the metasurface is made of plasmonic materials, the optical power will eventually be coupled into a surface wave (FIG. 6B). The wavevector of the surface wave can increase continuously, which results in enhanced confinement of the surface wave to the metasurface patterned by optical nano-antennas and progressively larger optical losses. Optical power can thus be dissipated via Joule heating in the plasmonic metasurface. Since the metasurface can control guided waves by strong, consecutive scattering events at the antenna array (FIG. 6A), the nano-antennas can have a collective action on the waveguide modes. This collective effect of the gradient meta-surface on guided waves can reduce the footprint of photonic integrated devices and simultaneously achieve broadband device performance, because of an inverse relation between device dimension and their working bandwidth.

In certain embodiments, the plurality of sensor nodes can change a mode of the one or more optical fibers. The optical near-fields of sensor nodes (e.g., nanoantennas) can contain both transverse electric (TE) and transverse magnetic (TM) polarized components (that is, electric-field components that can be polarized along they and z axis, respectively, in FIG. 6A). Thus, the nanoantennas can mediate an interaction between TE and TM waveguide eigenmodes, which otherwise cannot couple with each other in a bare waveguide and couple weakly in nanostructured waveguides.

Figure 9B:
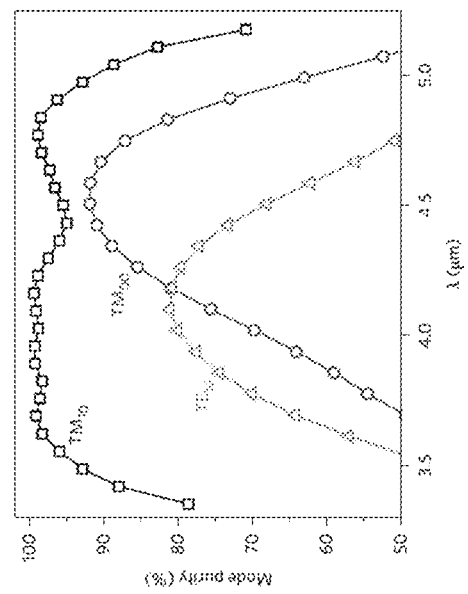
FIG. 9B provides plots illustrating purity of the converted modes as a function of wavelength which show that the devices can operate over a broad wavelength range.
Figure 9A:
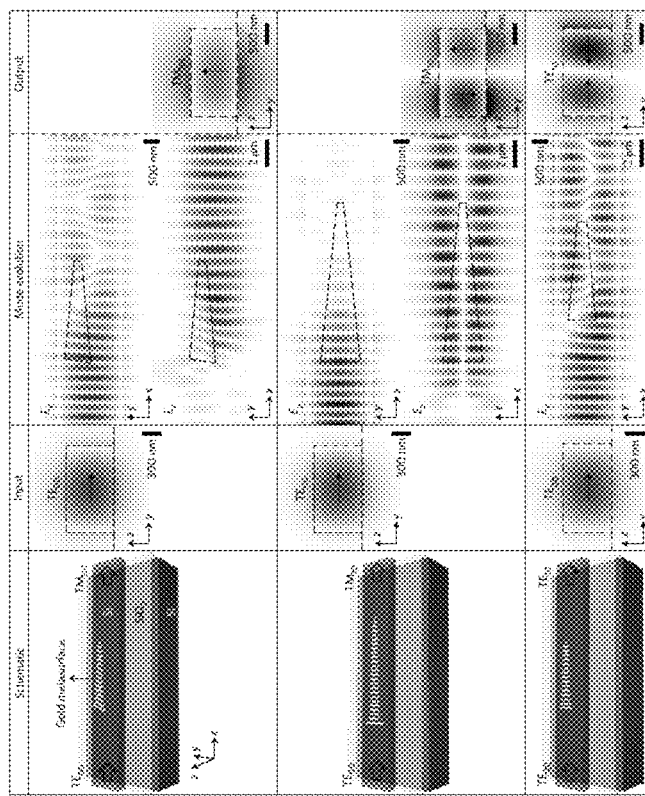
FIG. 9A provides simulated device performance data.

For example, FIG. 9A shows certain waveguide mode converters. The gradient metasurfaces can include phased arrays of gold nanorod antennas patterned on the top surface of silicon waveguides. The incident TE fundamental waveguide mode can be converted into the TM00, TM10 or TE10 mode, depending on the design parameters, which include the phase gradient, array length, offset of the antenna array from the waveguide center, and antenna orientation. The third column in FIG. 9A shows finite-difference time-domain simulations of mode evolution when light propagates from the left to the right through a region of the waveguide patterned with the gradient metasurfaces. The purity of the converted modes can approach unity, and high-purity mode conversion can be maintained over a broad wavelength range. For example, the purity of the converted TM10 mode can be above 90% within a wide wavelength range of $\lambda=3.5$-$5.1$ μm (FIG. 9B).

Figure 10B:
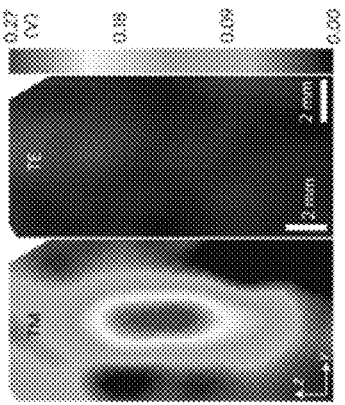
FIG. 10B provides measured far-field emission patterns of the $TE_{00}$-to-$TM_{00}$ mode converter (polarization rotator).
Figure 10D:
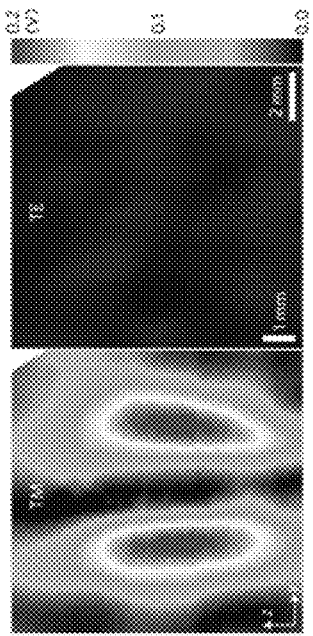
FIG. 10D provides measured far-field emission patterns of the TE00-to-$TM_{10}$ mode converter, showing two lobes with TM polarization and weak far-field with TE polarization.
Figure 10F:
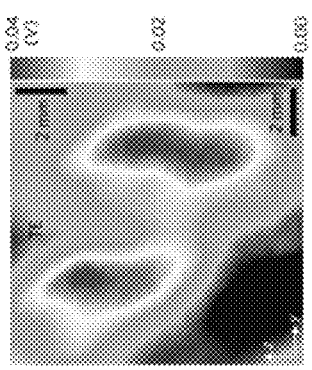
FIG. 10F provides measured far-field emission pattern of the TE00-to-$TE_{10}$ mode converter. The asymmetric far-field is due to defects on the cleaved waveguide output facet.
Figure 10A:
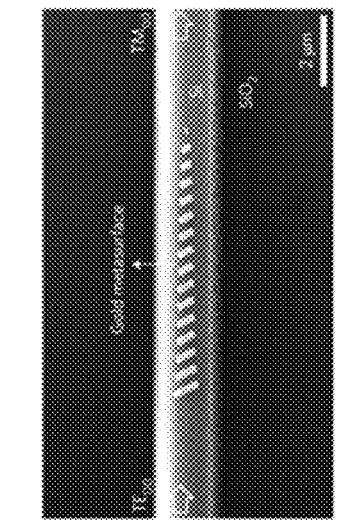
FIG. 10A provide a SEM image of the $TE_{00}$-to-$TM_{00}$ mode converter (perspective view, 30° from normal to the waveguide top surface).
Figure 10C:
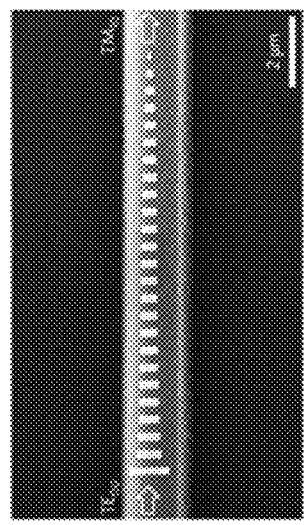
FIG. 10E provides a SEM image of the TE00-to-$TE_{10}$ mode converter.
Figure 10E:
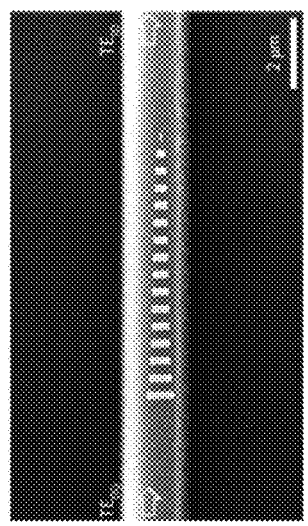

As embodied herein, FIGS. 10A-10F shows the performance of a few waveguide mode converters fabricated according to the designs in FIG. 9A. A grating coupler can be used to couple the output of a quantum cascade laser into the fundamental TE waveguide mode, which then interacts with gradient metasurfaces patterned on the wave-guides and can be converted into desired output waveguide modes. The converted modes can exit from the cleaved facet at the end of the waveguides and radiate into the far-field. FIG. 10B shows that the output from the TE00-to-TM00 mode converter (polarization rotator) can have only one far-field lobe with TM polarization, and that the TE-polarized far-field is comparatively weak, indicating that the incident TE00 mode has been converted into the TM00 mode with improved efficiency. The far-field profiles of the TE00-to-TM10 and TE00-to-TE10 mode converters can have two lobes but are TM- and TE-polarized, respectively. The residual TE-polarized component in the far-field is negligible for the TE00-to-TM10 mode converter (FIG. 10D), which indicates complete mode conversion. The far-field of the TE00-to-TE10 mode converter (FIG. 10F) is non-ideal because of an imperfectly cleaved waveguide output facet.

Figure 11A:
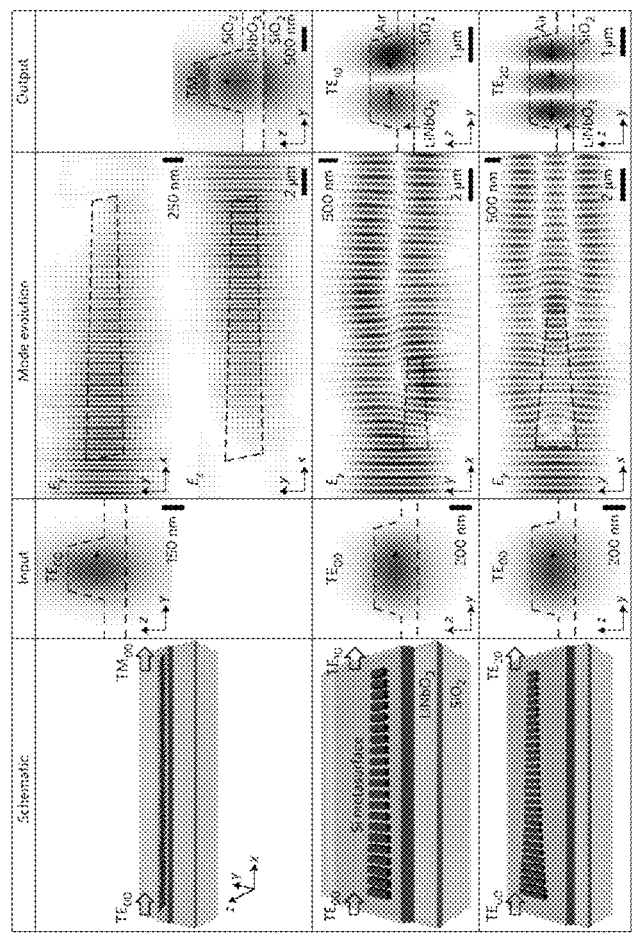
FIG. 11A provides simulated device performance at $\lambda=1.55$ µm.
Figure 11D:
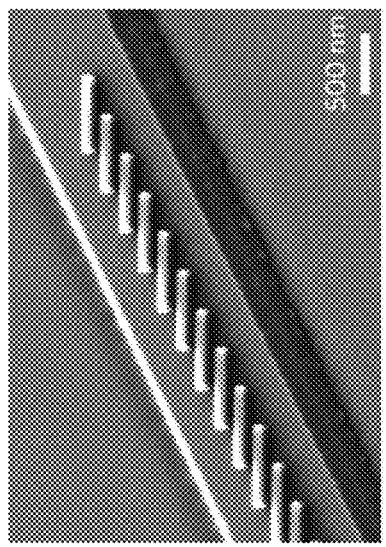
FIGS. 11C and 11D provides zoom-in views of FIG. 11B.
Figure 11C:
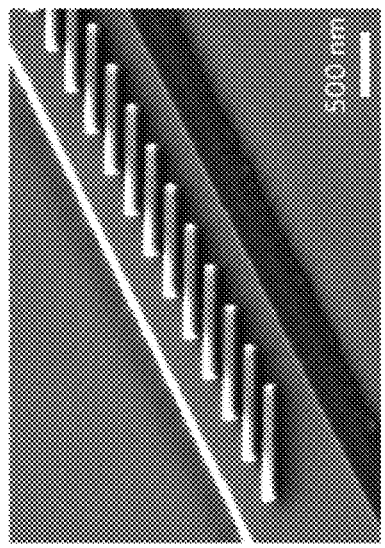
Figure 11B:
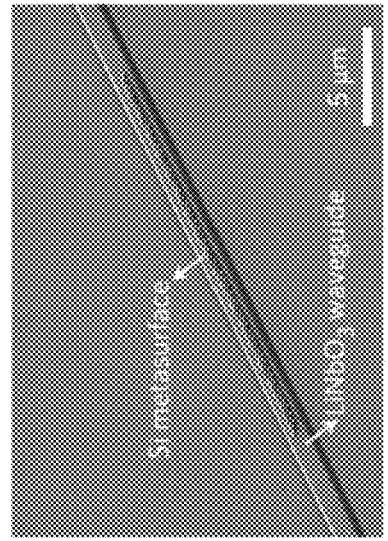
FIG. 11B provides a SEM image of a fabricated $TE_{00}$-to-$TM_{00}$ mode converter (before applying an overcoat of SiO2).
Figure 11F:
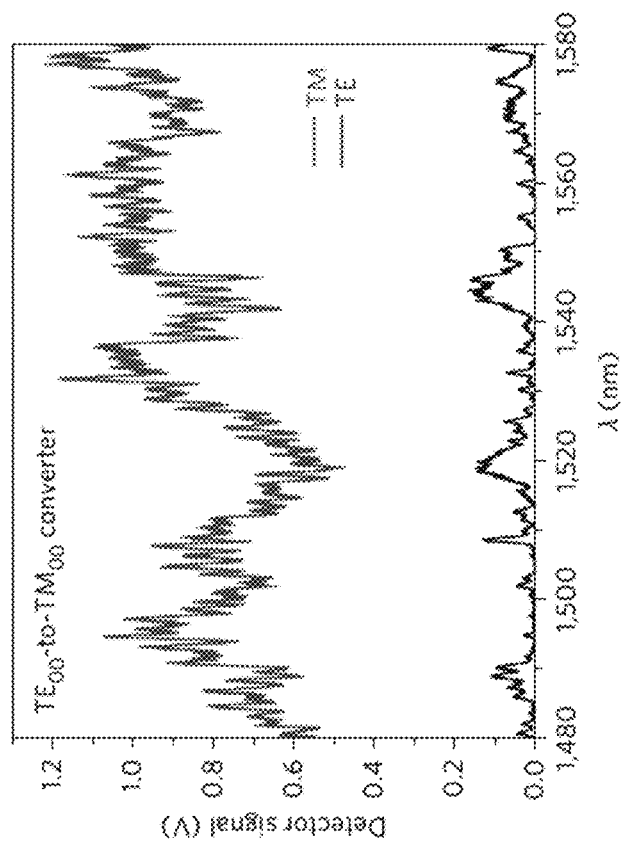
FIG. 11F provides a plot of TE- and TM-polarized components' detector signal at the output port of a TE00-to-TM00 mode converter, showing that the device operates over a broad wavelength range and has similar power transmission to the bare waveguide.

In certain embodiments, the optical nano-antennas can be used to create a gradient metasurface. The metasurface can be implemented in materials that support optical resonances. For example, gradient metasurfaces based on Mie resonators can decrease the optical absorption associated with optical resonances and thereby can reduce the insertion losses of waveguide mode converters. FIG. 11A shows a few such all-dielectric mode converters operating around the telecommunications wavelength of $\lambda=1.55$ μm. The devices can include silicon nanorods with different lengths located on the top surface of LiNbO3 waveguides. FIGS. 11B-11D provide scanning electron microscopy (SEM) images of a fabricated telecom TE00-to-TM00 mode converter according to the design shown in FIG. 9A. The TE fundamental wave-guide mode with tunable wavelengths between 1,480 and 1,580 nm can be launched into the TE00-to-TM00 mode converters as well as into bare waveguides with the same length and cross-sectional dimensions as the mode converters. FIGS. 6E and F provide measured spectra of the TE- and TM-polarized components of a bare waveguide and of a TE00-to-TM00 mode converter, respectively. The measured TE and TM components can be contributed by the TE00 and TM00 waveguide modes, respectively, because the LiNbO3 waveguides can be designed to support the fundamental TE and TM modes. Thus, the spectra in FIG. 11E indicate that the TE00 mode can be coupled into a bare waveguide and propagates along the entire length of the waveguide (2 mm), while maintaining high modal purity (>99%), and the spectra in FIG. 11F indicate that when the dielectric gradient metasurface is patterned on the waveguide, the TE00 mode launched into the device can be converted into a high-purity TM00 mode (with a purity of 96% averaged over $\lambda=1,480$-$1,580$ nm).

In certain embodiments, the subject matter provides a photo detector. The photo detector can be coupled or connected to the one or more optical fibers and measure the optical signal. For example, a thermal, a photochemical, a photoelectric, or a polarization photo detector can be connected to the optical fibers and measure the optical signal. In some embodiments, the photo detector can include a communications channel. For example, the communications channel can be attached to the photodetector and communicate the optical signal to one or more devices.

In non-limiting embodiments, the surveillance system can include a device which is communicatively coupled to the communications channel. The device can receive the optical and identify at least a location of the target based thereon (e.g., by tracing the optical signal). For example, a cell phone, a computer, or an external device can analyze the characteristics of the optical signal detected by the photo detector and determine whether there is a target present in the area covered by the surveillance system (e.g., a leak on the roof) and the location of the target (e.g., position of the leak on the roof). Such analysis can derive the location of the chemical because each section of the fiber can be decorated with a certain type of sensor nodes. For example, if the detector detects a change to the transmitted light that matches with the characteristics of section A in the horizontally oriented fiber and section 1 in the vertically oriented fiber, the location of the water leak can then be traced down to the region where fiber section A and fiber section 1 intersect (FIG. 1).

The disclosed subject matter provides a method for detecting a change in at least one physical parameter of a target illuminated by electromagnetic radiation. The method can include embedding one or more optical fibers, each having a plurality of sensor nodes, in an architecture. For example, the optical fibers can be deployed at the regions of a roof that are most likely to leak, such as the places where air condition units, solar panels, chimneys or other installations on the roof meet the roof surface. Likewise, the distribution of sensor notes on a single optical fiber can be concentrated at the regions that are most likely to leak. In some embodiments, the architecture can include a roof, a road, a ceiling, and a wall.

In certain embodiments, the method can further include transmitting the electromagnetic radiation into the one or more optical fibers and detecting an optical signal. Each of the one more optical fibers can include a plurality of sensor nodes which can induce an interaction between the change in the at least one physical parameter and the transmitted electromagnetic radiation to generate the optical signal. In non-limiting embodiments, the change in the at least one physical parameter can include a water leak, a gas leak, and a temperature change. In some embodiments, the plurality of sensor nodes can alter the transmitted electromagnetic radiation responsive to the interaction by inducing an optical decay and/or a temporal optical power change of the transmitted electromagnetic radiation. In other embodiments, the electromagnetic radiation can match with an absorption bandwidth of the change in the at least one physical parameter.

In certain embodiments, the method can further include communicating the optical signal. In some embodiments, the method can include determining a location of the target by tracing the optical signal. In non-limiting embodiments, the method can also include modifying a distribution of the plurality of sensor nodes to adjust sensitivity.

Example 1—Controlling Propagation and Coupling of Waveguide Modes Using Phase-Gradient Metasurfaces This example illustrates methods for fabricating optical fibers and the use of optical fibers for controlling propagation and coupling of waveguide modes.

Materials and Method

Design of waveguide mode converters: The 'array factor' and 'form factor' of the gradient metasurface structure were tailored to realize efficient conversion between two waveguide modes. From the perspective of ray optics, the wavevector of each waveguide mode has a characteristic bending angle (FIG. 6). Therefore, the role of the gradient metasurface can be to bend the wavevector of the incident waveguide mode by the proper amount so that the resulting wavevector matches that of a desired output waveguide mode. The incident waveguide mode interacts with the gradient metasurface many times, and each interaction bends the wavevector in accord with the magnitude and direction of the effective wavevector $k_{eff}=d\Phi/dx$. Therefore, by controlling the 'array factor' via properly choosing $d\Phi/dx$ and the length of the gradient metasurface, optical power is preferentially coupled into the desired waveguide mode.

The broadband performance of the mode converters is a result of the small device footprint. The optical analogue of the uncertainty principle prescribes that an object's spatial dimension is inversely proportional to its momentum spread in k-space. The gradient metasurface structure has a length equivalent to only a few wavelengths, so it is able to scatter an incident waveguide mode into any direction within a finite angular range that is inversely proportional to the length of the metasurface structure. The efficiency of coupling into a certain output waveguide mode will be high as long as its wavevector is within that finite angular range, and the wavevector of any other waveguide mode is outside it.

The lengths of the metasurface structures range from two to about ten times the free-space wavelength. For example, the mid-infrared $TE_{00}$-to $TM00$ and $TE00$-to-$TE_{10}$ mode converters shown in FIG. 10 both have a length of 7.5 µm, which is ~1.8 times their central operating wavelength, $\lambda=4$ µm, while the telecom TE00-to-TM00 mode converter shown in FIG. 6b has a length of 20.3 µm, which is ~13 times its central operating wavelength, $\lambda=1.55$ µm. The length of the metasurface structures cannot be much shorter than one free-space wavelength because, if the metasurfaces are too short, the uncertainty of the unidirectional wavevector they provide will be too large, which will prevent the realization of pure mode conversion.

In addition to the 'array factor', the selectivity of mode conversion can be enhanced by engineering the scattering pattern of individual nanoantennas (the 'form factor'). Physically, the conversion between waveguide modes is mediated by optical scattering by the antennas. Therefore, an essential condition for efficient coupling from one mode to another is that the antenna near-fields and the waveguide modes have a large spatial overlap on the waveguide cross-section. In other words, $$\frac{\left|\int\int E_{antenna}(y,z)\cdot E_{wg}^{*}(y,z)dydz\right|^{2}}{(\int\int|E_{antenna}(y,z)|^{2}dydz)\cdot(\int\int|E_{wg}(y,z)|^{2}dydz)}$$

should be large. Here Eantenna(y, z) represents near-fields around a single nanoantenna, Ewg(y, z) is the incident or output waveguide mode, and the integration is over the waveguide transverse cross-section (that is, the y-z plane). As the antenna near-fields contain both y- and z-polarized components, the gradient metasurfaces are able to facilitate coupling between TE- and TM-polarized waveguide modes. By properly choosing the location and orientation of nanorod antennas on the top surface of the waveguide, the value of the above integral was controlled and thus fine-tune the coupling efficiency was available between two waveguide modes.

Device fabrication: The devices were fabricated by a combination of chemical vapour deposition, electron-beam lithography and reactive ion etching. For the devices supporting asymmetric optical power transmission (FIG. 8), the Si3N4 films were deposited onto SiO2/Si wafers using low-pressure chemical vapour deposition (LPCVD). For the mid-infrared waveguide mode converters (FIG. 10), the Si films were deposited onto SiO2/Si wafers using plasma-enhanced chemical vapour deposition (PECVD). Electron-beam lithography was used to pattern gold antenna arrays and alignment marks on the Si3N4 or Si films. A second electron-beam lithography step was used to create etch masks to define the waveguides. Chromium was used as the etch mask for the Si3N4 waveguides. Polymethyl methacrylate (PMMA) electron-beam resist was used as the etch masks for defining Si waveguides. Care was taken to ensure that the antenna arrays and the waveguide etch masks were precisely aligned. Reactive ion etching was then used to etch waveguides. The etch masks were eventually removed.

The telecom waveguide mode converters (FIG. 11) were processed from lithium niobate on insulator (LNOI) wafers, which consist of lithium niobate thin films bonded onto silica substrates. Electron-beam lithography and reactive ion etching were used to first pattern lithium niobate ridge waveguides. An amorphous silicon (a-Si) layer was then deposited over the etched surface using PECVD. A second electron-beam lithography and reactive ion etching step was used to pattern the a-Si layer on the top surface of the lithium niobate waveguides into arrays of nanoantennas. The fabricated waveguides and Si nanoantennas were clad in a silica layer using PECVD. Finally, waveguide facets were diced and polished to ensure reliable and repeatable coupling efficiencies.

The devices supporting asymmetric optical power transmission (FIG. 8B) were fabricated using the following procedure. A 4-μm SiO2 film was deposited onto a Si substrate using plasma-enhanced chemical vapor deposition (PECVD). A 1.4-μm SiN film was then deposited onto the as-prepared SiO2/Si wafer using low-pressure chemical vapor deposition (LPCVD). The composition and thickness of the SiN film were determined using energy-dispersive X-ray spectroscopy (EDX). This wafer was then rinsed and cleaned using Acetone, IPA, and DI water, followed by oxygen plasma treatment for 5 min. After that, double layers of polymethyl methacrylate (PMMA) electron-beam resist (i.e., 495K PMMA A4 and 950K PMMA A2) were spun onto the wafer and the wafer was baked at 180° C. for 5 minutes for the first PMMA layer and for 3 minutes for the second PMMA layer. The phased antenna arrays as well as the alignment marks were patterned using electron-beam lithography (i.e., electron-beam exposure using JEOL6300-FX at a beam current of 250 pA, development in an IPA and DI water mixture solution at 4° C., metallization by electron-beam deposition of 3-nm Cr and 50-nm Au films, and lift-off using two baths of Microposit Remover 1165 at 80° C. overnight).

A second electron-beam lithography step was conducted to pattern the waveguides. Double layers of PMMA (i.e., 495K PMMA A6 and 950K PMMA A2) were used as the electron-beam resist. In addition, a layer of Espacer 300Z was spun onto the top of the wafer to prevent strong charging effects during electron-beam exposure. Y-branch waveguides were defined using aligned exposure at a beam current of 4 nA. The wafer was then rinsed in DI water to get rid of the Espacer layer and developed in an IPA and DI water mixture at 4° C. After the development, a 100-nm Cr film was deposited onto the wafer using electron-beam evaporation, followed by overnight lift-off in Microposit Remover 1165 at 75° C. The wafer was descummed using oxygen plasma at 20° C. for 15 seconds to remove electron-beam resist residues. The Cr pattern served as an etch mask and waveguides were etched into the SiN film using inductively coupled plasma reactive-ion etching (ICP-RIE) (i.e., 6 sccm Ar, 55 sccm H2, 40 sccm CF4, 15 mTorr chamber pressure, 125 W RF power, 600 W ICP power, 7.5 minutes). The Cr mask was removed using wet etching (i.e., Transene Cr etchant 1020 at room temperature for 14 minutes). Finally, the wafer was cleaved to form input and output waveguide ports.

The mid-infrared waveguide mode converters shown in FIG. 10 were fabricated using a combination of PECVD, electron-beam lithography, RIE, and electron-beam deposition. A 0.75-μm amorphous silicon (a-Si) film was deposited by PECVD on a silicon wafer with 5-μm thick thermally grown SiO2. Double layers of PMMA (i.e., 495K PMMA A4 and 950K PMMA A2) were spun onto the wafer and the wafer was baked at 170° C. for 10 minutes for the first PMMA layer and for 2 minutes for the second PMMA layer. Electron-beam lithography (i.e., electron-beam exposure using JEOL6300-FX at a beam current of 1 nA) was used to pattern gold antenna arrays and alignment markers with a development in an IPA and DI water mixture solution (3:1) for 2 minutes at 4° C., followed by electron-beam deposition of 3-nm Cr and 50-nm Au films, and a standard overnight lift-off procedure in Acetone. A second electron-beam lithography step was used to create PMMA etch masks to define waveguides. A single layer of PMMA (i.e., 400-nm 950K PMMA A6) was spun onto the wafer and the wafer was baked at 170° C. for 15 minutes. Electron-beam lithography (i.e., electron-beam exposure using a NanoBeam e-Beam writer at a beam current of 1 nA for the grating coupler and 4 nA for the waveguides) was conducted with care using alignment marks to make sure that the antenna arrays and the waveguide etch masks were precisely aligned. The same mixture of IPA and DI water was used for the development. The waveguides were etched into the Si film using RIE (i.e., 18 sccm O2, 40 sccm SF6, 15 W RF power, 800 W ICP power, 37 seconds) after oxygen plasma cleaning (i.e., 50 sccm O2, 50 W RF power, and 800 W ICP power at 30 mTorr and 20° C. for 15 seconds). The PMMA etch masks were removed using Acetone. The wafer was cleaved to form output waveguide ports for far-field measurements.

The telecom waveguide mode converters shown in FIG. 11 were fabricated using the following procedure. X-cut lithium niobate on insulator (LNOI) wafers obtained from NANOLN, with a 400-nm lithium niobate layer bonded on top of a 2-μm SiO2 buffer layer, were used for device fabrication. A 600-nm hydrogen silsesquioxane (HSQ) resist layer was spun on the wafer and patterned with electron-beam lithography. The patterned HSQ was subsequently used as an etch mask to define lithium niobate ridge waveguides using an optimized $Ar^+$ plasma etching, as is described in C. Wang et al. *Opt. Express* 22, 30924-30933 (2014). The fabricated ridge waveguides for the TE00-to-TM00 mode converters have a top width of 0.95 μm and a ridge height of 250 nm, leaving a 150-nm lithium niobate slab underneath the waveguides. The side walls of the waveguides as a result of the plasma etching have a tilting angle of 40 degrees with respect to the normal of the waveguide top surfaces. The residual HSQ was removed in buffered oxide etch (BOE). A 75-nm p-doped a-Si layer was subsequently deposited on the etched surface using PECVD. With the help of alignment marks, a 300-nm HSQ resist layer was then patterned on the a-Si layer on the waveguide top surfaces using electron-beam lithography. Reactive ion etching was conducted to transfer the second HSQ pattern into the a-Si layer. A second BOE etch was used to remove the residual HSQ resist. The fabricated waveguides and a-Si nano-antennas were cladded in a 3-μm SiO2 layer using PECVD. Finally, waveguide facets were diced and polished to ensure reliable and repeatable optical coupling efficiencies.

Device layout and characterization: The devices that support asymmetric optical power transmission (FIG. 8) consist of a Y-branch waveguide and two gradient metasurfaces with opposite orientations. Each waveguide branch was patterned with one gradient metasurface. Linearly polarized light from a broadly tunable mid-infrared laser was butt-coupled into the input port of the devices. The guided optical power was equally split at the Y-junction and coupled into the TE fundamental waveguide mode in each of the two branches. A mid-infrared camera was used to image the optical spots at the two output ports of each Y-device. The camera images taken with a wire-grid polarizer were processed to quantify the difference in optical power transmission through the two waveguide branches.

The mid-infrared waveguide mode converters (FIG. 10) consist of a grating coupler, a waveguide taper, a narrowed segment of waveguide, a 90° waveguide turn, a segment of waveguide patterned with a gradient metasurface structure, a second waveguide taper and a cleaved facet for light outcoupling. Emission from a quantum cascade laser was collimated and focused onto the grating coupler. The narrowed segment of waveguide was used to purify the TE fundamental waveguide mode. The 90° turn in the waveguide was used to separate the signal propagating along the waveguide from the optical background guided by the silicon substrate. The incident $TE_{00}$ mode interacts with the gradient metasurface structure and is converted into a desired output waveguide mode, which eventually radiates into the far-field from the cleaved facet at the end of the device. The converted mode was characterized by raster-scanning the far-field using a liquid-nitrogen-cooled single-pixel indium antimonide detector. A wire-grid polarizer was placed in front of the detector to characterize the polarization of the output mode.

The telecom waveguide mode converters (FIG. 11) were characterized using a butt-coupling set-up. Telecom light with tunable wavelengths was coupled into and collected from the polished facets of the lithium niobate waveguides using tapered and lensed fibers. A three-paddle fiber polarization controller was used to ensure that TE-polarized light was launched into the waveguides. The fiber-collected output light was converted into light propagating in free space and the TE and TM output polarization components were separated and detected using an InGaAs photodetector.

Devices supporting asymmetric optical power transmission: The devices supporting asymmetric optical power transmission consist of Y-branch waveguides, with a distance of 500 μm between two output ports. The phased antenna arrays with opposite orientations were fabricated on top of the two waveguide branches with a width of 2.5 μm. The input port was tapered from a width of 10 μm to 2.5 μm; the two output ports were tapered from 2.5 μm to 10 μm. Both input and output ports were cleaved. FIG. 12 shows additional SEM images of fabricated devices.

Figure 13:
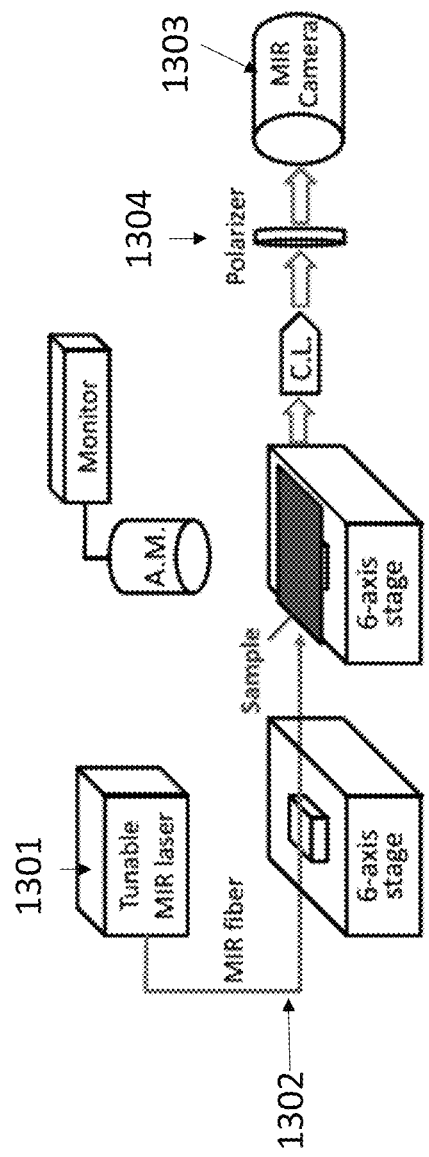
FIG. 13 provides a schematic illustration of the experimental setup used to characterize the performance of the devices supporting asymmetric optical power transmission in waveguides. Here, A. M. and C. L. represent alignment microscope and convex lens, respectively.
Figure 14A:
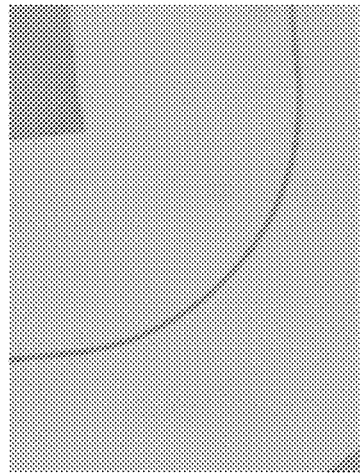
FIG. 14A provides a photographic image of Grating coupler that couples laser light into the waveguide.
Figure 14B:
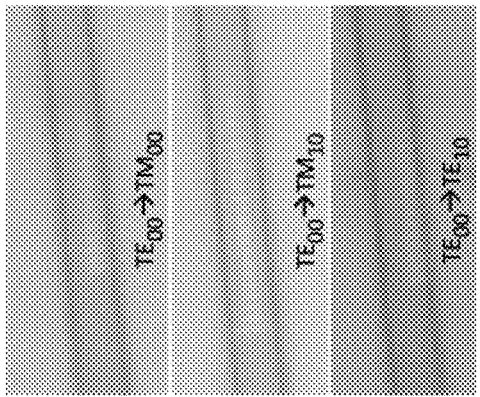
FIG. 14B provides a photographic image of 90-deg bend that separates the signal propagating along the waveguide from the optical background guided by the silicon substrate.
Figure 14C:
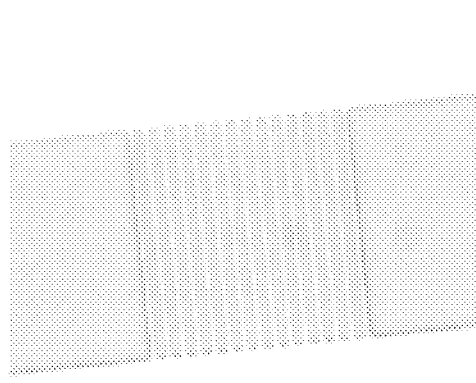
FIG. 14C provides a photographic image of tapered waveguide at the output port.
Figure 14D:
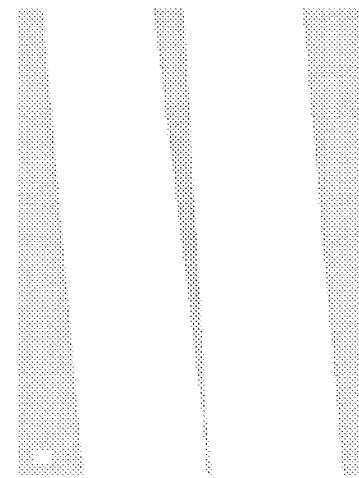
FIG. 14D provides photographic images of phased antenna arrays in three different devices.

A schematic of the experimental setup used to characterize the devices supporting asymmetric optical power transmission is shown in FIG. 13. The light source 1301 is a broadly tunable laser (Firefly-IR, M Squared Lasers, λ=2.5-3.8 μm, 5 nm linewidth), which is coupled to a ZrF4 mid-infrared single-mode fiber 1302. The polarization of the light coming out of the fiber can be controlled by a fiber coupler. Light was coupled from the fiber into the input port of the devices via butt coupling. A mid-infrared camera 1303 was used to image the optical spots at the two output ports of the devices. A wire-grid polarizer 1304 was placed in front of the camera to control the polarization of the light that enters the camera.

Figure 15:
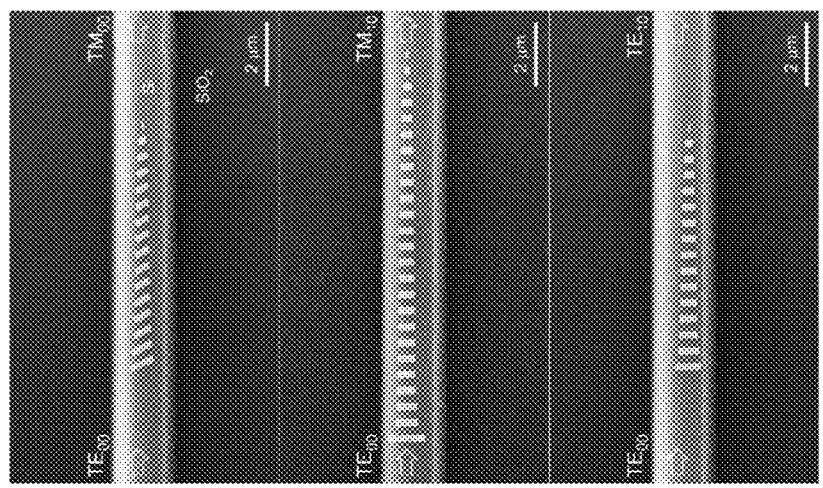
FIG. 15 provides high resolution SEM images of the mid-infrared waveguide mode converters.

Mid-infrared waveguide mode converters: Each of the waveguide mode converters consists of a grating coupler, a waveguide taper, a narrowed segment of waveguide for purifying the TE fundamental waveguide mode, a 90-degree waveguide turn, a segment of waveguide patterned with a phased antenna array, a second waveguide taper, and a cleaved facet for light out-coupling. The entire device is 7-10 mm in length. FIG. 14 shows optical images of the waveguide mode converters. High-resolution SEM images of the devices are shown in FIG. 15.

Figure 16:
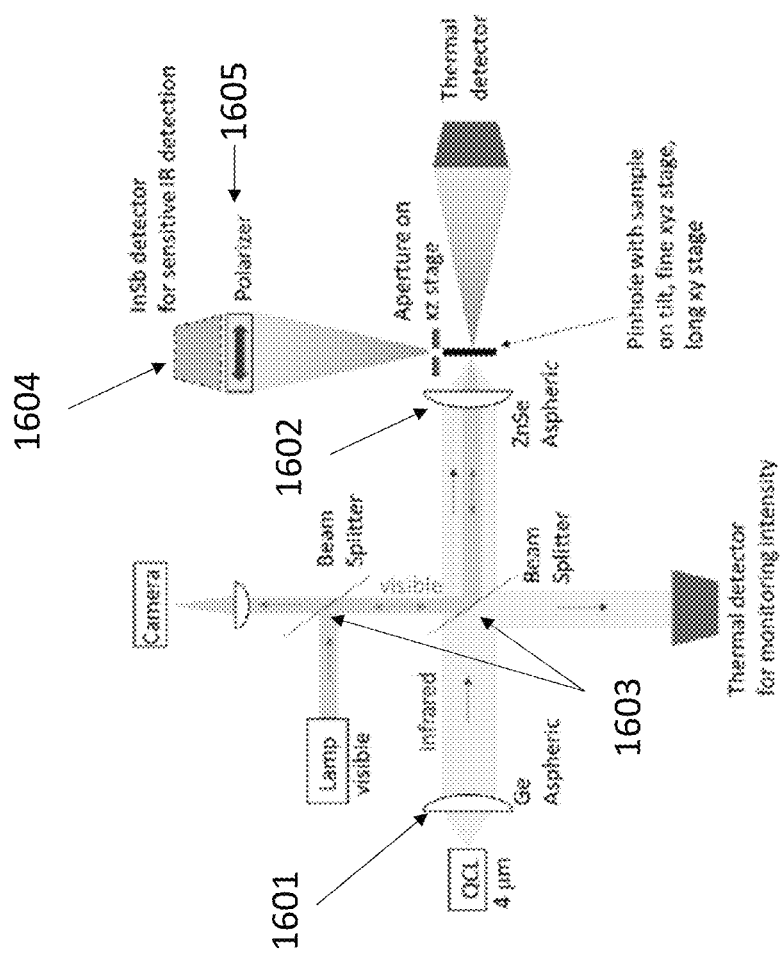
FIG. 16 is a schematic illustration of the experimental setup used to characterize the mid-infrared waveguide mode converters.

To characterize the waveguide mode converters, the emission at λ=4 μm from a quantum cascade laser was collimated using a germanium aspheric lens 1601 (1-inch diameter, numerical aperture or NA of 0.7, anti-reflective coating at λ=3-5 μm) and focused using a ZnSe aspheric lens 1602 (1-inch diameter, NA of 0.45, anti-reflective coating at λ=3-5 μm) onto the grating coupler. The size of the focal spot of the laser beam is ~7.5 μm, which was measured using the knife-edge method. The focused laser beam has an average power of ~20.5 mW. A pellicle beam splitter 1603 that is transparent at λ=3-5 μm and reflective in the visible was used to overlap the beam paths of the mid-infrared and the visible light. The chromatic aberration of the ZnSe lens 1602 operating in the mid-infrared and in the visible was characterized so that we could rely on visible light for optical alignment to efficiently couple the λ=4 μm laser emission into the grating coupler. The waveguide grating coupler is 40 μm×40 μm size and couples ~10% of the focused laser power into the waveguide. The narrowed segment of waveguide is 1.8 μm in width and 50 μm in length and cuts off all waveguide modes except for the TE00 mode. The 90-degree turn in the waveguide helps separate the signal propagating along the waveguide from the optical background guided by the silicon substrate. The TE00 mode then interacts with the phased antenna array and is converted into a desired waveguide mode, which eventually radiates into the far-field from the cleaved facet at the end of the device. By raster scanning the far-field using a liquid-nitrogen-cooled single-pixel InSb detector 1604, we were able to characterize the properties of the converted modes. A ZnSe wire-grid polarizer 1605 was placed in front of the InSb detector to monitor the polarization of the output mode. A schematic of the experimental setup is shown in FIG. 16.

Figure 17:
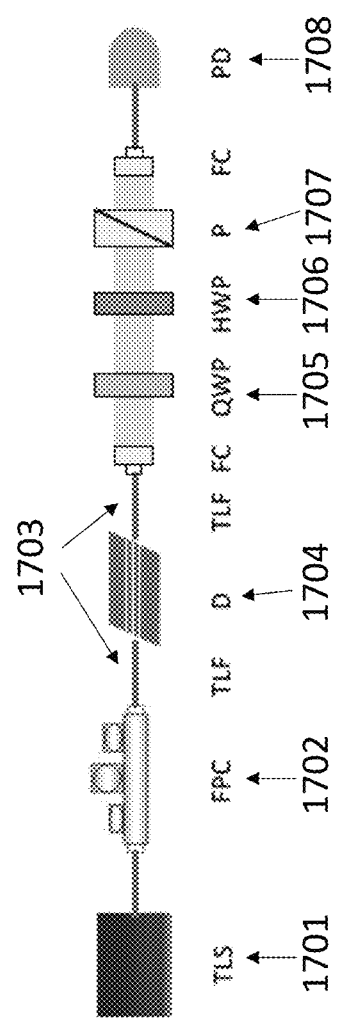
FIG. 17 provides a schematic illustration of the experimental setup used to characterize the telecom waveguide mode converters. TLS: Tunable laser source; FPC: 3-paddle fiber polarization controller; TLF: Tapered and lensed fiber; D: Device; FC: Fiber coupler; QWP: Quarter-wave plate; HWP: Half-wave plate; P: Polarizer; PD: InGaAs photodetector.

Telecom waveguide mode converters: The telecom waveguide mode converters shown in FIG. 11 have straight waveguides and the total length of the devices is about 2 mm after dicing and polishing. The devices 1704 were characterized using a butt coupling setup (FIG. 17). Telecom light 1701 (Santec TSL-510, λ=1480-1580 nm) was coupled into and collected from the polished facets of the lithium niobate waveguides using tapered and lensed fibers 1703. A 3-paddle fiber polarization controller 1702 was used to ensure that TE-polarized light was launched into the waveguides. The fiber-collected output light was converted into light propagating in the free space using a fiber bench (Thorlabs), in order to accurately measure the output polarization state. A quarter-wave plate 1705 and a half-wave plate 1706 were first used to compensate for any circular polarization introduced by the fibers and rotate the output polarization into the predefined axes. A polarizer 1707 was then used to select the TE and TM output polarization components, before the signal was sent into an InGaAs photodetector 1708 for detection.

Additional Experimental and Simulation Data on Device Performance

Figures 18A, 18B, 18C:
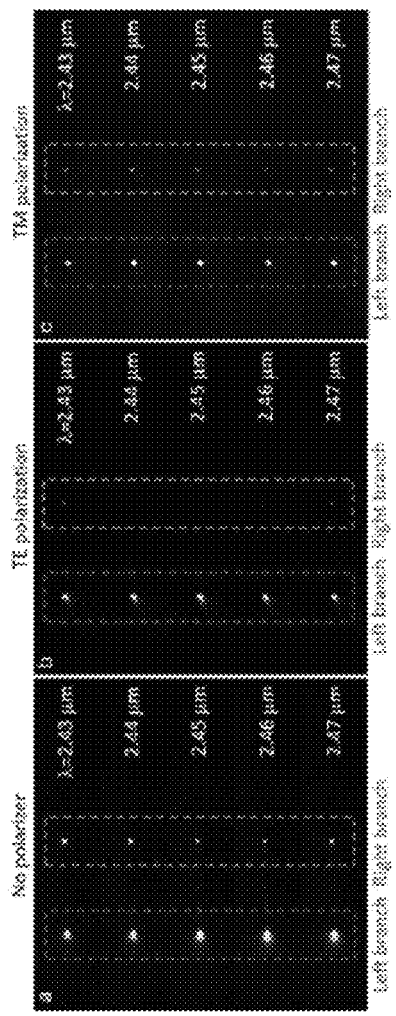
FIG. 18A provides infrared camera images of two output ports of a device at different wavelengths without the polarizer in front of the camera.
FIG. 18B provides infrared camera images of two output ports of a device with the polarizer to select the TE-polarized component.
FIG. 18C provides infrared camera images of two output ports of a device with the polarizer to select the TM-polarized component.

Polarization analysis of the device supporting asymmetric optical power transmission: The fabricated devices have slightly under-etched waveguides (i.e., fabricated waveguide thickness of ~900 nm, designed value of 1000 nm), which leads to incomplete mode conversion in the left branch (i.e., the output from the left port has a mixture of the converted TM10 mode and unconverted TE00 mode; FIG. 18). However, in the right branch the conversion from the TE00 mode to surface waves is sufficiently strong that the transmission from the right port is very small around $\lambda=2.45$ µm. The waveguide under-etch just leads to a smaller wavelength range for observing asymmetric optical power transmission.

Power dissipation in the mid-infrared waveguide mode converters: Full-wave simulations were conducted to analyze the power dissipation in the mid-infrared waveguide mode converters. The results are summarized in Table 1, which shows that optical power reflected back to the input port and scattered outside of the waveguides is very small. Optical power that is not transmitted through the devices is mainly absorbed by the plasmonic antennas and eventually dissipated as Joule heat.

Figure 20A:
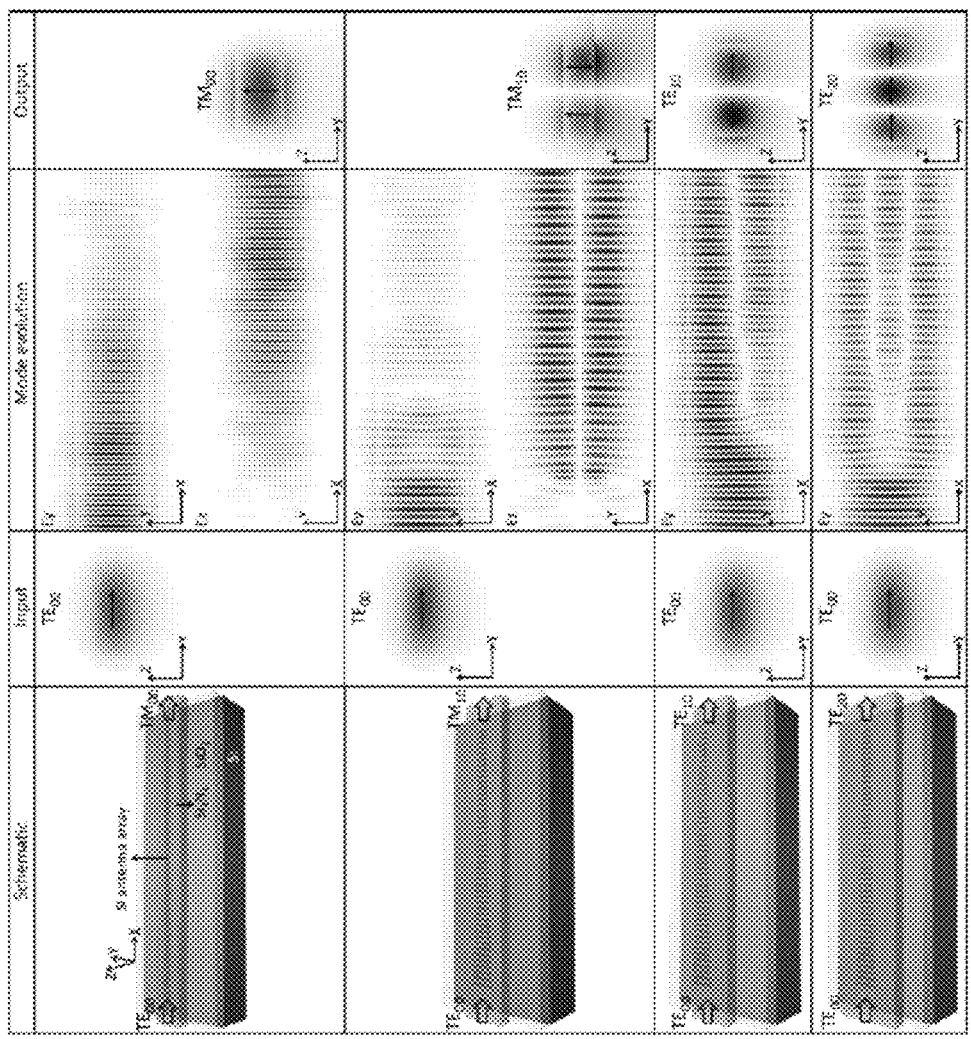
FIG. 20A provides simulated device performance data of telecom waveguide mode converters based on the Si/Si3N4 materials platform.
Figure 20B:
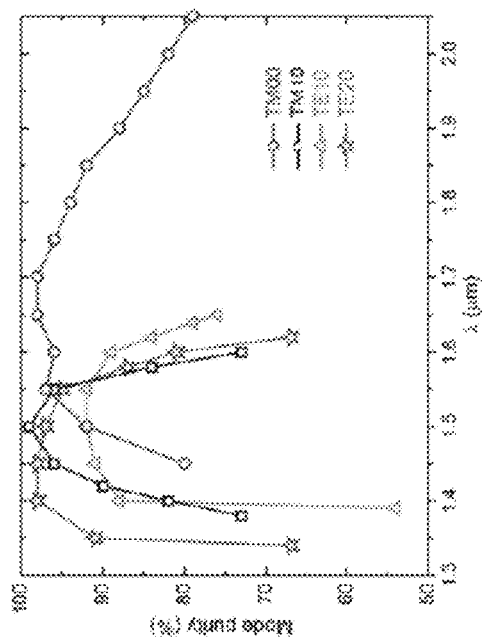
FIG. 20B provide plots illustrating purity of the converted modes as a function of wavelength, showing that the devices can operate over a broad wavelength range around $\lambda=1.55$ μm.
Figure 21B:
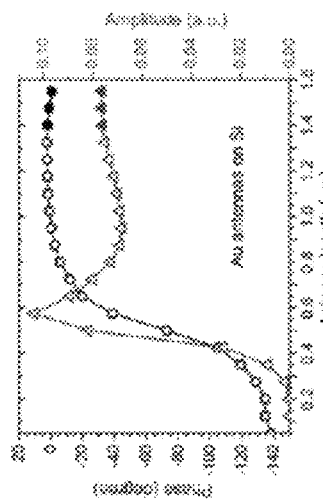
FIG. 21B provides plots illustrating phase and amplitude of scattered light from gold nanorod antennas located on a Si substrate as a function of the antenna length.
Figure 21D:
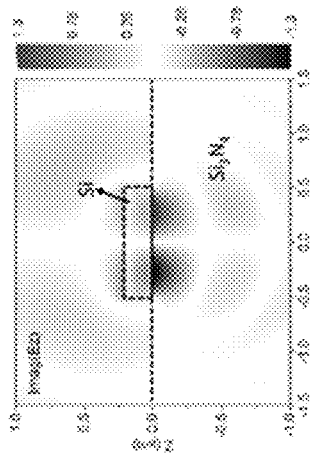
FIG. 21D provides graphs providing simulated near-field distribution (Ez component) of the dipolar Mie resonance in a Si nanorod at $\lambda=1.55$ μm.
Figure 21F:
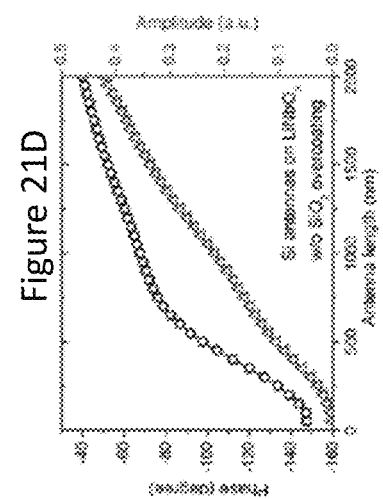
FIG. 21F provides plots illustrating phase and amplitude of scattered light from Si nanorod antennas located on a LiNbO3 substrate as a function of the antenna length.
Figure 21A:
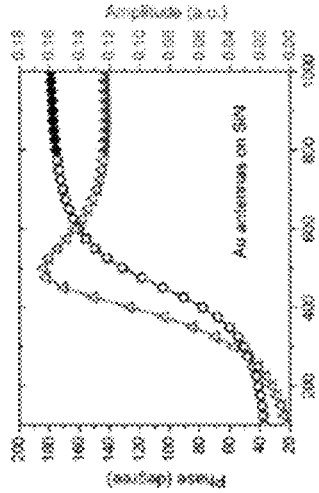
FIG. 21A provides plots illustrating phase and amplitude of scattered light from gold nanorod antennas located on a Si3N4 substrate as a function of the antenna length. The phase response is a result of plasmonic resonance in the gold nanorods.
Figure 21C:
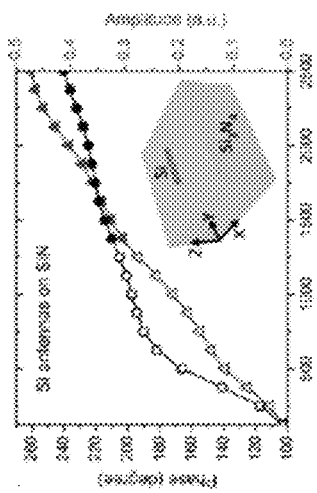
FIG. 21C provides plots illustrating phase and amplitude of scattered light from Si nanorod antennas located on a Si3N4 substrate as a function of the antenna length.

Similar to the devices reported in FIG. 11, we engineered the dipolar Mie resonances in the silicon nanorods to achieve controllable antenna phase response (i.e., constant phase difference between adjacent Si nano-antennas). FDTD simulations of the mode evolution (third column in FIG. 20A) show that mode conversion is achieved within a propagation distance of ~15 times of the free-space wavelength. The purity of the converted waveguide modes and the optical transmission of the all-dielectric mode converters are quite high. For example, the $TE_{00}$-to-$TM_{00}$ mode converter, or polarization rotator, has a power transmission of 91%, and 97% of the transmitted power is carried by the $TM_{00}$ mode at $\lambda=1.55$ µm. The waveguide mode converters have broadband performance. For example, the purity of the converted TM00 mode in the polarization rotator is above 80% within a wide wavelength range from $\lambda=1.45$ µm to 2.1 µm (FIG. 20B). FIG. 20 provides simulated device performance. The first column shows device schematics. The gradient metasurface structures consist of phased arrays of silicon antennas patterned on Si3N4 waveguides. The silicon nanorods support dipolar Mie resonances, and are designed to introduce a unidirectional phase gradient along the waveguide. The second and fourth columns show, respectively, waveguide modes at the input and output ports of the devices. The polarization of the electric field component of the modes is indicated by arrows. The third column shows mode evolutions as light propagates from left to right. The transmission efficiency of the polarization rotator (first device) is 91%; transmission efficiencies of other devices are

TABLE 1

Power dissipation in the mid-infrared waveguide mode converters

| Device | Transmission | Reflection | Scattering | | | Absorption |
| | | | Upward | Downward | Sideways | |
|---|---|---|---|---|---|---|
| $TE_{00} \rightarrow TM_{00}$<br>$\lambda = 4.50$ µm | 67.0% | 2.1% | 0.5% | 2.8% | 0.3% | 27.3% |
| $TE_{00} \rightarrow TM_{10}$<br>$\lambda = 4.16$ µm | 35.8% | 1.9% | 0.9% | 5.4% | 0.5% | 55.5% |
| $TE_{00} \rightarrow TM_{10}$<br>$\lambda = 4.10$ µm | 70.9% | 1.6% | 0.5% | 2.4% | 0.4% | 24.2% |

Figures 19A, 19B, 19C:
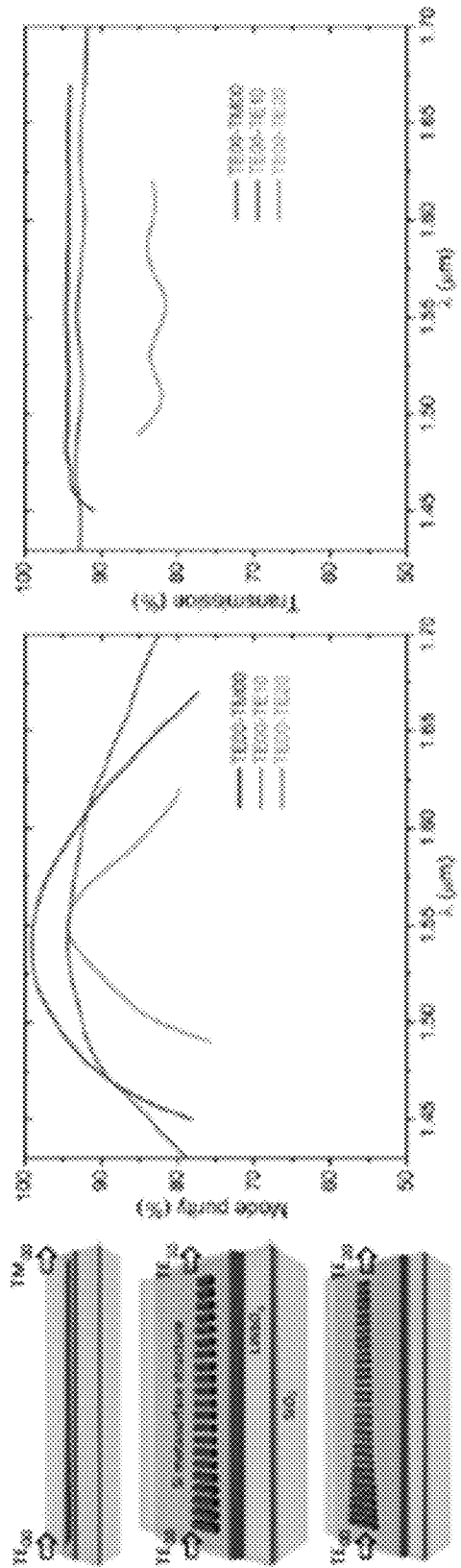
FIG. 19A provides a schematic illustration of the telecom waveguide mode converters consisting of Si phased antenna arrays patterned on LiNbO3 waveguides.
FIG. 19B provides plots illustrating simulated purity of the converted modes as a function of wavelength.
FIG. 19C provides plots showing simulated optical power transmission of the devices as a function of wavelength.

Simulated mode purity and transmission efficiency for the telecom mode converters based on Si/LiNbO3 materials platform: FIG. 19 provides simulated mode purity and transmission efficiency for the all-dielectric telecom mode converters. FIG. 19A provides schematic of the telecom waveguide mode converters consisting of Si phased antenna arrays patterned on LiNbO3 waveguides (same as those shown in FIG. 11A). FIG. 19B provides simulated purity of the converted modes as a function of wavelength. FIG. 19C provides simulated optical power transmission of the devices as a function of wavelength. The broadband operation and small insertion losses shown in these simulations are consistent with experimental observations (FIG. 11).

Telecom waveguide mode converters based on Si/Si3N4 materials platform: All-dielectric, low-loss waveguide mode converters can be demonstrated using the Si/Si3N4 materials platform. FIG. 20 shows a few such waveguide mode converters operating around the telecommunications wavelength of $\lambda=1.55$ µm. The devices consist of silicon nanorods with different lengths patterned on the top surface of Si3N4 waveguides. Detailed design parameters are shown in Table 5.

above 70%. (FIG. 20B) Purity of the converted modes as a function of wavelength, showing that the devices can operate over a broad wavelength range around $\lambda=1.55$ µm.

Design of phased antenna arrays: Four different materials platforms have been used in our work: (a) gold antennas on Si3N4 waveguides for devices supporting asymmetric optical power transmission, (b) gold antennas on Si waveguides for mid-infrared waveguide mode converters, (c) Si antennas on LiNbO3 waveguides for telecom waveguide mode converters (with or without SiO2 overcoatings), and (d) Si antennas on Si3N4 waveguides for telecom waveguide mode converters. Here, (a)-(c) include both device designs using full-wave simulations and experimental demonstrations, and (d) includes only device designs using full-wave simulations. For each of the four materials platforms we created a library of nano-antennas based on which the gradient metasurfaces were constructed.

The amplitude and phase response of a nano-antenna is determined using full-wave simulations in the following way. The antenna is placed on an interface between air and an infinitely large substrate of the same material as the waveguide (in case (c) where a SiO2 overcoating is used, the antenna is placed on an interface between SiO2 and an infinitely large substrate of LiNbO3). A plane wave launched from inside the substrate impinges on the interface in the normal direction. The electric-field component of the incident wave is aligned with the nanorod antenna. We monitor the amplitude and phase of the wave scattered from the antenna back into the substrate. The phase responses both in the intermediate-field (i.e., a distance of one wavelength) and in the far-field (i.e., a distance of ~10 wavelengths) are recorded, and are found to be essentially the same. By varying the length of the nanorod antenna, while keeping antenna width and thickness unchanged, we are able to obtain the amplitude and phase responses of the antenna as a function of the antenna length (FIG. 21). The total phase coverage obtained by varying antenna length ranges from 70 degrees to 140 degrees according to the specific materials system used.

To construct a gradient metasurface, we choose a set of antennas with varying lengths so that the phase response changes by a step of $d\Phi$, and arrange the antennas into a linear array with a subwavelength spacing of dx between neighbors, thus creating a constant phase gradient of $d\Phi/dx$ along the gradient metasurface.

The above design procedure monitors the phase response of antennas located on the interface between two semi-infinite media, which is an approximation for antennas patterned on waveguides. To obtain more accurate antenna phase response, we conduct pairs of simulations, one with a bare waveguide and the other with an antenna located on the top surface of the waveguide. By subtracting the field distributions in the two simulations, the scattered fields of the antenna were obtained (some exemplary scattered fields are shown in FIG. 23). In this way, the phase and amplitude responses of an antenna excited by a waveguide mode were determined. The phase and amplitude responses obtained by this method are essentially the same as those obtained from antennas located on an infinitely large substrate.

In either the free-space or the waveguide configuration described above, we only monitor the phase and amplitude responses of single isolated antennas, while ignoring the near-field coupling between neighboring antennas in gradient metasurfaces. The near-field coupling could change the phase of the scattered waves from the antennas by a small amount and perturb the phase gradient $d\Phi/dx$ so that it is not exactly a constant. Such near-field coupling typically leads to a slight red-shift of the operating wavelength range of our devices, which is not of critical importance because the operating wavelength range of the devices is quite large.

Device design parameters: The device supporting highly asymmetric optical power transmission as shown in FIGS. 7 and 8 are based on gold nanorod antennas patterned on Si3N4 waveguides, which are located on a SiO2/Si substrate. The SiO2 layer has a thickness of 4 μm to prevent coupling of guided optical power into the Si substrate. The antenna array consists of 56 gold nanorods. Detailed design parameters are provided in Table 2.

TABLE 2

Design parameters of devices supporting asymmetric optical power transmission.

| | |
|---|---|
| Central operating wavelength $\lambda_o$ (μm) | 2.45 |
| Dimensions of waveguide cross-section (μm × μm) | 2.5 × 1.0 |
| Number of antennas | 56 |
| Antenna width/thickness/spacing (nm) | 150/50/300 |
| Antenna array length (μm) | 16.5 (=6.73$\lambda_o$) |
| Antenna lengths (nm) | 100 174 218 248 272 292 310 326 336 348 356 364 372 378 384 392 398 402 408 412 418 422 428 432 436 440 446 450 454 458 462 468 472 476 482 486 490 496 502 508 514 520 526 534 542 550 560 570 582 596 612 630 654 682 718 770 |
| Phase incremental (degrees) | 2.5 |
| Antenna offset from waveguide central axis (nm) | 0 |
| Antenna rotation from y direction (degrees) | 0 |

The mid-infrared waveguide mode converters and polarization rotator shown in FIGS. 9 and 10 are based on gold nanorod antennas patterned on Si waveguides, which are located on a SiO2/Si substrate. The SiO2 layer has a thickness of 5 μm. Detailed design parameters are provided in Table 3.

TABLE 3

Design of parameters of mid-infrared waveguide mode converters and polarization rotator.

| Device | $TE_{00} \rightarrow TM_{00}$ | $TE_{00} \rightarrow TM_{10}$ | $TE_{00} \rightarrow TE_{10}$ |
|---|---|---|---|
| Modal index change | 2.625 → 1.843 | 2.717 → 1.609 | 2.733 → 2.181 |
| Central operating wavelength $\lambda_o$ (μm) | 4.5 | 4.16 | 4.10 |
| Dimensions of waveguide cross-section (μm × μm) | 2.1 × 0.75 | 2.1 × 0.75 | 2.1 × 0.75 |
| Number of antennas | 16 | 25 | 16 |
| Antenna width/thickness/spacing dx (nm) | 200/50/500 | 200/50/500 | 200/50/500 |
| Antenna array length (μm) | 7.5 (=1.67$\lambda_o$) | 12 (=2.88$\lambda_o$) | 7.5 (=1.83$\lambda_o$) |
| Antenna lengths (nm) | 61 274 343 392 431 452 473 494 514 534 554 574 609 645 723 864 | 61 184 293 336 370 400 427 441 454 467 480 493 506 519 532 544 557 570 588 610 633 663 718 787 1306 | 61 274 343 392 431 452 473 494 514 534 554 574 609 645 723 864 |
| Phase incremental $d\Phi$ (degrees) | 9 | 5.7 | 9 |

TABLE 3-continued

Design of parameters of mid-infrared waveguide mode converters and polarization rotator.

| Device | $TE_{00} \to TM_{00}$ | $TE_{00} \to TM_{10}$ | $TE_{00} \to TE_{10}$ |
|---|---|---|---|
| Antenna offset from waveguide central axis (nm) | 400 | 0 | 200 |
| Antenna rotation from y axis (degrees) | 20 | 0 | 0 |
| Effective interactions between guided wave and antenna array $k_o(n_{in} - n_{out})/(d\Phi/dx)$ | 3.5 | 8.4 | 2.7 |

The all-dielectric telecom waveguide mode converters and polarization rotator shown in FIG. 11 are based on Si nanorod antennas patterned on LiNbO3 waveguides, which are located on SiO2 substrates. Detailed design parameters are provided in Table 4.

TABLE 4

Design parameters of telecom wavelength mode converters based on Si/LiNbO3 materials platform.

| Device | $TE_{00} \to TM_{00}$ | $TE_{00} \to TE_{10}$ | $TE_{00} \to TE_{20}$ |
|---|---|---|---|
| Modal index change | 1.796 → 1.713 | 1.818 → 1.757 | 1.825 → 1.722 |
| Central operating wavelength $\lambda_o$ (μm) | 1.55 | 1.55 | 1.55 |
| Waveguide Top width (μm) | 0.95 | 2.3 | 3.0 |
| Waveguide Sidewall tilted angle | 40 | 40 | 40 |
| Waveguide Thickness (nm) | 250 | 250 | 250 |
| LiNbO$_3$ thin film Thickness (nm) | 400 | 400 | 400 |
| Number of Antennas | 55 | 21 | 32 |
| Antenna width/thickness/spacing dx (nm) | 105/145/375 | 175/175/270 | 175/175/270 |
| Antenna array length (μm) | 20.25 (=13.1$\lambda_o$) | 5.40 (=3.5$\lambda_o$) | 8.37 (=5.4$\lambda_o$) |
| Antenna lengths (nm) | 681 686 690 694 698 702 707 711 715 720 724 729 733 738 742 747 752 756 761 766 771 776 781 786 791 796 801 806 812 817 823 828 834 840 845 851 857 863 869 875 881 888 894 901 907 914 921 927 934 941 948 954 961 967 974 | 401 411 421 430 440 450 461 471 482 493 505 517 530 543 557 571 585 601 617 635 654 | 437 447 457 468 478 489 501 513 526 539 552 566 580 595 612 629 647 668 690 715 742 773 809 850 896 947 1002 1058 1111 1161 1211 1259 |
| Phase incremental dΦ (degrees) | 0.15 | 1.5 | 1.5 |
| Antenna offset from waveguide central axis (nm) | 0 | 550 | 0 |
| Antenna rotation from y axis (degrees) | 60 | 0 | 0 |
| Effective interactions between guided wave and antenna array $k_o(n_{in} - n_{out})/(d\Phi/dx)$ | 48.2 | 2.6 | 4.3 |

The all-dielectric telecom waveguide mode converters and polarization rotator shown in FIG. 20 are based on Si nanorod antennas patterned on Si3N4 waveguides, which are located on SiO2/Si substrates. Detailed design parameters are provided in Table 5.

TABLE 5

Design parameters of telecom waveguide mode converters based on Si/Si3N5 materials

| Device | $TE_{00} \to TM_{00}$ | $TE_{00} \to TM_{10}$ | $TE_{00} \to TE_{10}$ | $TE_{00} \to TE_{20}$ |
|---|---|---|---|---|
| Modal index change | $1.734 \to 1.690$ | $1.682 \to 1.439$ | $1.682 \to 1.533$ | $1.710 \to 1.539$ |
| Central operating wavelength $\lambda_o$ (μm) | 1.55 | 1.55 | 1.55 | 1.55 |
| Waveguide cross-section (μm × μm) | 1.2 × 0.7 | 1.8 × 0.45 | 1.8 × 0.45 | 2.8 × 0.45 |
| Number of antennas | 50 | 45 | 45 | 45 |
| Antenna width/thickness/spacing dx (nm) | 150/150/500 | 200/200/370 | 200/200/400 | 200/200/380 |
| Antenna array length (μm) | 24.5 (=15.8$\lambda_o$) | 22 (=14.2$\lambda_o$) | 22 (=14.2$\lambda_o$) | 22 (=14.2$\lambda_o$) |
| Antenna lengths (nm) | All 1000 | 306 314 322 330 338 346 354 362 370 378 385 392 400 407 415 422 430 437 445 452 460 467 475 482 489 497 507 519 530 542 554 565 577 589 600 612 624 646 669 693 716 739 774 818 862 | 306 314 322 330 338 346 354 362 370 378 385 392 400 407 415 422 430 437 445 452 460 467 475 482 489 497 507 519 530 542 554 565 577 589 600 612 624 646 669 693 716 739 774 818 862 | 306 314 322 330 338 346 354 362 370 378 385 392 400 407 415 422 430 437 445 452 460 467 475 482 489 497 507 519 530 542 554 565 577 589 600 612 624 646 669 693 716 739 774 818 862 |
| Phase incremental dΦ (degrees) | 0 | 1.5 | 1.5 | 1.5 |
| Antenna offset from waveguide central axis (nm) | 0 | 0 | 400 | 0 |
| Antenna rotation from y axis (degrees) | 60 | 0 | 0 | 0 |
| Effective interactions between guided wave and antenna array $k_o(n_{in} - n_{out})/(d\Phi/dx)$ | NA (form birefringence) | 13.9 | 9.2 | 10.1 |

Robust device performance against fabrication errors: FIG. 22 shows a comparison between the performance of a mid-infrared waveguide mode converter with accurate design parameters and that of a fabricated device. The errors in the length of fabricated antennas range from −90% for the shorted antenna rod to −6% for the longest antenna rod. A majority of the fabricated antennas have lengths that are −10% longer than their designed values. Nevertheless, the device performance is robust as the purity of the converted TM10 mode still approaches unity over a broad wavelength range. Results show that the fabrication errors in the several longest and shortest antennas have minimal effect on the performance of the waveguide mode converters. The device performance is mainly affected by the antennas with intermediate sizes: increase and decrease of the sizes of these antennas together lead to red and blue shift of the device performance spectrum, respectively, but do not affect the device performance at the central operating wavelength.

Selective mode conversion via engineering the form factor of antennas: Antenna near-fields contain both TE- and TM-polarized components, which have their characteristic spatial distributions. By properly choosing the location of nanorod antennas on the waveguide top surface and the orientation of the antennas, we can control the strength of interaction between the antennas and a specific waveguide mode, and realize selective coupling between two waveguide modes. Here are a few examples: (1) When a nanorod antenna is placed at the center of the waveguide top surface, its horizontally polarized near-field component (FIG. 23B) has a good spatial overlap with the TE00 mode (FIG. 23A), and its vertically polarized near-field component (FIG. 23D) has a good spatial overlap with the TM10 mode (FIG. 23C); therefore, such antenna could have strong interactions with both the TE00 and TM10 modes. The TE00-to-TM10 mode converter in FIGS. 9-11, and 20 is based on antennas located at the center of the waveguide top surface. (2) When a nanorod antenna is displaced from the center of the waveguide (for example, by 400 nm), its horizontally polarized near-field component (FIG. 23F) has a non-zero spatial overlap with the TE10 mode (FIG. 23E). Therefore, the TE00-to-TE10 mode converter in FIGS. 9-11, and 20 is based on such displaced antennas. (3) When a nanorod antenna is oriented at a non-zero angle (for example, 20 degrees) with respect to the transverse cross-section of the waveguide, its vertically polarized near-field component (FIG. 23H) has a non-zero spatial overlap with the TM00 mode (FIG. 23G). Therefore, the TE00-to-TM00 mode converter (i.e., polarization rotator) in FIGS. 9-11, and 20 is based on such rotated antennas.

Coupled-mode theory for highly asymmetric mode coupling: A special coupled-mode theory for describing directional mode coupling (FIG. 7) in the devices can be derived from the conventional coupled-mode theory for two co-propagating waveguide modes:

$$\begin{cases} \dfrac{da(z)}{dz} = -i\kappa_{ab} b(z) e^{i\Delta\beta z} \\ \dfrac{db(z)}{dz} = -i\kappa_{ba} a(z) e^{-i\Delta\beta z} \\ \Delta\beta = \beta_a - \beta_b - K \end{cases}$$

Here a(z) and b(z) are the amplitude of the two waveguide modes, $\beta a$ and $\beta b$ are their propagation constants, $\Delta\beta$ is the wavevector mismatch, z is the propagation direction, and kab and kba are the coupling coefficients between the modes. Specially, $$\begin{cases} \kappa_{ab} \propto A_+ \int\int \Delta\varepsilon(x,y)a(x,y)b(x,y)dxdy \\ \kappa_{ba} \propto A_- \int\int \Delta\varepsilon(x,y)a(x,y)b(x,y)dxdy \end{cases}$$

where A+ and A− are, respectively, the Fourier expansion coefficients of the +K and −K wavevector components introduced by the perturbation Δε(z) along the waveguide (Reference: Section 13.4, Amnon Yariv, *Optical Electronics in Modern Communications*, 5$^{th}$ ed., Oxford University Press, 1997), and the integration is carried in the xy plane (i.e., waveguide transverse cross-section). Conventionally, a grating patterned on the waveguide is used for mode conversion. The gating provides effective wavevectors ±K of equal magnitude (i.e., A+≠A−) so that the +K component compensates the wavevector mismatch when mode a is converted to mode b, and the −K component compensates the wavevector mismatch when mode b is converted to mode a. Therefore, under perfect phase matching condition K=βa−βb, the above coupled-mode equations become $$\begin{cases} \dfrac{da(z)}{dz} = -i\kappa_{ab}b(z) \\ \dfrac{db(z)}{dz} = -i\kappa_{ba}a(z) \end{cases}$$

where κab=κba. That is, optical power can be coupled from mode a to mode b and from mode b back to mode a equally easily.

The major difference between our gradient metasurfaces and a conventional grating is that the gradient metasurfaces provide effective wavevectors ±K of different magnitude (i.e., A+≠A−); that is, the Fourier expansion coefficients of the +K and □K wavevector components introduced by the gradient metasurfaces are no longer the same. The metasurface provides a stronger optical scattering when mode a is coupled to mode b, but weaker optical scattering when mode b is coupled back to mode a. Therefore, the coupling coefficients are not equal: κab≠κba. This is the main modification to the conventional coupled-mode theory.

An additional modification to the coupled-mode equations is to add a loss term (characterized by model absorption coefficient α) to each equation to account for light absorption by the plasmonic antennas during the mode conversion process. A further modification to the coupled-mode equations is to make all coupling coefficients and absorption coefficients spatially varying (for example, ka−>kabf(z), and αa−>αaf(z)), because the scattering strength and absorption is dependent upon the antenna geometry, and antennas with different lengths are used in the gradient metasurfaces. Here f(z) is proportional to the scattering/absorption cross-section of the antennas and is obtained from simulations. f(z) for light propagating in the forward direction becomes f(−z) for light propagating in the backward direction, as shown in FIG. 24.

The above is how we arrived at our new coupled-mode equations:

$$\begin{cases} \dfrac{da_1}{dz} = -i\kappa_{12}f(z)a_2 - i\kappa_{13}f(z)a_3 - \alpha_1 f(z)a_1 \\ \dfrac{da_2}{dz} = -i\kappa_{21}f(z)a_1 - i\kappa_{23}f(z)a_3 - \alpha_2 f(z)a_2 \\ \dfrac{da_3}{dz} = -i\kappa_{31}f(z)a_1 - i\kappa_{32}f(z)a_2 - \alpha_3 f(z)a_3 \end{cases}$$

where a1, a2 and a3 represent the amplitudes of the TE00 mode, the TM10 mode, and the surface wave, respectively; κab is the coupling coefficient that governs the efficiency of coupling from mode b to mode a, and κab≠κba; αa is the absorption coefficient of mode a.

The derivation of this new coupled mode theory is completely based on conventional coupled mode theory and on physical properties of our gradient metasurfaces (i.e., asymmetric Fourier expansion coefficients of the waveguide perturbation: A+≠A−, loss due to absorption in plasmonic metasurfaces, and spatial variation of the scattering and absorption coefficients).

Figure 7B:
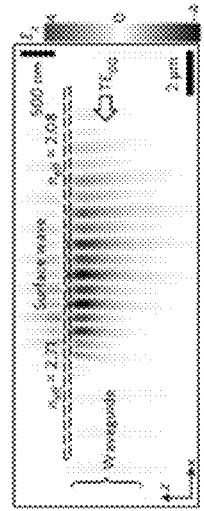
FIG. 7B provides full-wave simulations showing conversion of the incident transverse electric (TE) fundamental mode into the transverse magnetic (TM) 10 mode into surface waves in the backward direction. Black dashed lines indicate the location of the antenna array.
Figure 7D:
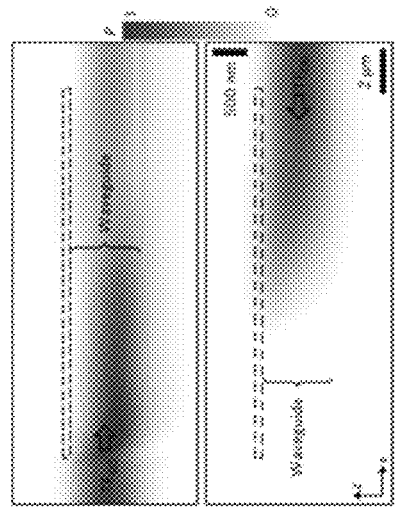
FIG. 7D provides spatial distribution of the magnitude of the Poynting vector, showing an asymmetric optical power flow as a result of the directional mode conversion. Black dashed lines indicate the location of the antenna array.
Figure 7A:
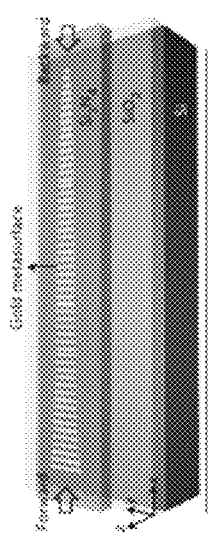
FIG. 7A provides a schematic illustration of a device working around $\lambda=2.5$ µm.
Figure 7C:
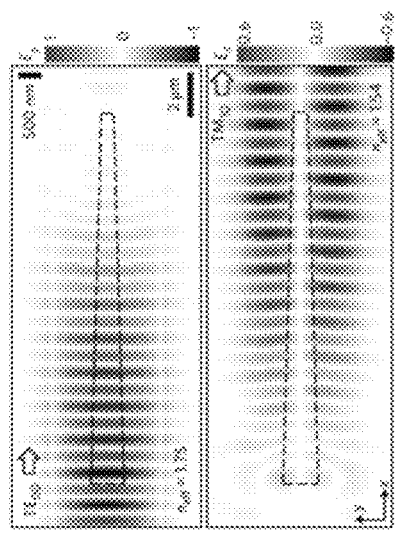
FIG. 7C provides full-wave simulations showing the conversion of the TE fundamental mode into the TM 10 mode in the forward propagation direction. The effective mode index $n_{eff}$ evolves differently in two opposite propagation directions.
Figure 7G:
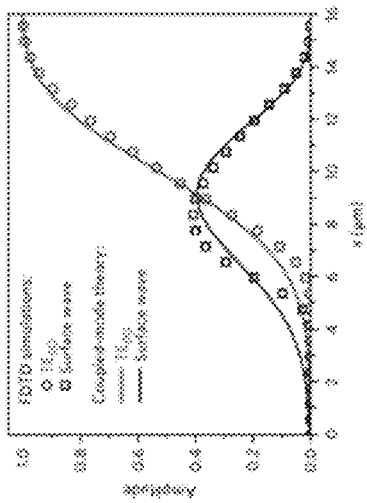
FIGS. 7F and 7G provides plots of mode evolution as a function of propagation distance in opposite propagation directions.
Figure 7F:
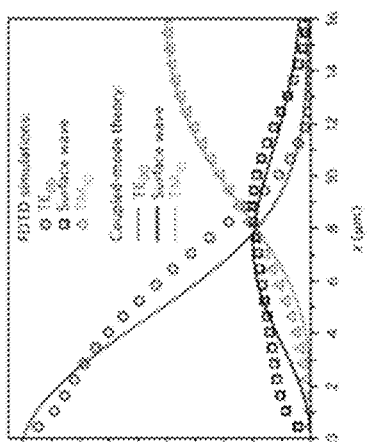

The parameters used to fit simulated mode evolutions in FIGS. 7F and 7G are listed in Table 6.

TABLE 6

Fitting parameters used in the coupled mode equations.

| | κ12 (μm$^{-1}$) | κ21 | κ13 | κ31 | κ23 | κ32 | α1 | α2 | α3 |
|---|---|---|---|---|---|---|---|---|---|
| Backward | 0 | 0 | 1.1 | 5.9 | 0 | 0 | 0.26 | 0 | 0.8 |
| Forward | 0 | 0 | 1.2 | 0.8 | 1.2 | 0.3 | 0.12 | 0.1 | 0.1 |

In Table 6, the coupling coefficients κ12 and κ21 are set to be zero for both the forward and backward propagation directions. This due to the fact that the TE00 and TM10 modes have small overlap with each other even in the presence of the metasurfaces compared with the overlap between either mode with the surface wave (e.g., κ12<<κ13).

In the backward propagation direction, the asymmetric wavevector/phase gradient provided by the gradient metasurface leads to a continuous increase of the wavevector. As a result, the incident TE00 mode couples efficiently into a surface wave supported by the antenna array (i.e., κ31 is large). The asymmetry of the phase gradient ensures that optical power won't be coupled back from the surface wave to the TE00 mode efficiently (i.e., κ13 is small). Therefore, Table 6 shows that κ31 is much larger than κ13. The absorption coefficient α3 for the surface wave is much larger than that of the TE00 mode, α1, because of the much stronger interaction between the surface wave and the antenna array. In our full-wave simulations in which the TE00 mode is launched into the device in the backward direction, we observed that the input TE00 mode is directly converted into surface waves, and that there is no TM10 mode generated at any location of the device. This observation motivated us to neglect the TM10 mode in the backward propagation direction by taking κ23 and κ32, as well as α2 to be zero in Table 6.

In the forward propagation direction (i.e., mode conversion), the gradient metasurface causes a decrease of the wavevector. Therefore, it is favorable for optical power to couple from the surface wave to the TE00 (TM10) mode and the opposite process is less efficient. This is the reason that in Table 6, κ13 (κ23) that governs the coupling from the surface wave to the TE00 (TM10) mode is larger than κ31 (κ32) that governs the coupling from the TE00 (TM10 mode) to the surface wave.

Figure 25:
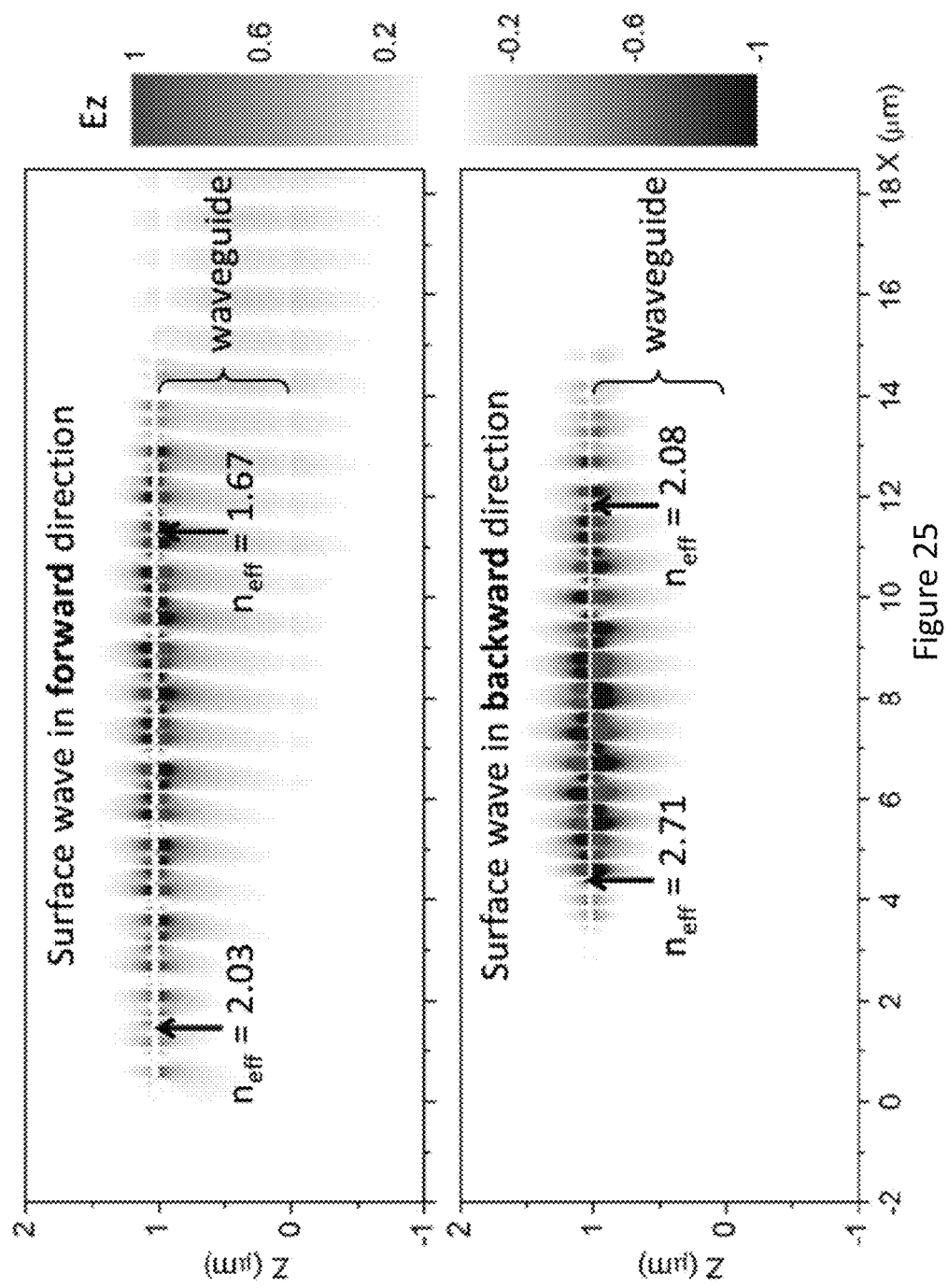
FIG. 25 provides simulated surface waves in the forward and backward propagation directions.

The nature of the surface waves in the forward and backward propagation directions are different. Our FDTD simulations show that the surface wave in the backward propagation direction is much more confined to the antenna array and has a much larger effective wavevector compared to the surface wave in the forward propagation direction (Fig. S14). This is because in the backward propagation direction the gradient metasurface causes a continuous increase of the longitudinal component k∥ of the wavevector of the surface wave, and therefore a continuous increase of the transverse component ik⊥ of the wavevector, which is imaginary and characterizes the confinement of the surface wave. k∥ and ik⊥ are related by the dispersion relation: $(k\|)^2 + (ik\perp)^2 = k_{eff}^2$, where keff is the product of free-space wavevector and the optical refractive index of the waveguide material and is a constant. The different nature of the surface waves in the forward and backward propagation directions leads to a difference in the degree of asymmetry of the coupling coefficients: the difference between K31 and K13 is much larger in the backward propagation direction compared to that in the forward direction (Table 6). FIG. 25 provides simulated surface waves in the forward and backward propagation directions. The confinement of the surface wave propagating in the backward direction is stronger, and its effective wavevector is larger, than the surface wave propagating in the forward direction.

Results and Discussion

Using gradient metasurfaces to control guided waves: A gradient metasurface structure patterned on the top surface of an optical waveguide (FIG. 6) enables asymmetric coupling of waveguide modes: when an incident waveguide mode propagates against keff, the bending angle of its wavevector increases, which corresponds to coupling from lower-order into higher-order waveguide modes (FIG. 6A); conversely, when an incident waveguide mode propagates along keff, a higher-order waveguide mode is converted to a lower-order mode. If the metasurface is made of plasmonic materials, the optical power will eventually be coupled into a surface wave (FIG. 6B). The wavevector of the surface wave increases continuously, which results in enhanced confinement of the surface wave to the metasurface and progressively larger optical losses. Optical power will thus be dissipated via Joule heating in the plasmonic metasurface.

The gradient metasurface controls guided waves by strong, consecutive scattering events at the antenna array (FIG. 6A). As a result, the antennas have a collective action on the waveguide modes. Over a propagation distance of only a few times the wavelength, an effective wavevector many times larger than the phase gradient dΦ/dx can be imparted to the incident mode, resulting in a large overall wavevector change (as a comparison, gradient metasurfaces only transfer a single effective wavevector of dΦ/dx to optical waves propagating in free space). This collective effect of the gradient meta-surface on guided waves enables us to substantially reduce the footprint of photonic integrated devices and simultaneously achieve broadband device performance, because of an inverse relation between device dimension and their working bandwidth.

An additional advantage of using metasurfaces to control wave-guide modes is that the optical near-fields of nanoantennas contain both transverse electric (TE) and transverse magnetic (TM) polarized components (that is, electric-field components that are polarized along they and z axis, respectively, in FIG. 6). Therefore, nanoantennas are able to mediate a strong interaction between TE and TM waveguide eigenmodes, which otherwise cannot couple with each other in a bare waveguide and couple weakly in nanostructured waveguides.

Figure 7E:
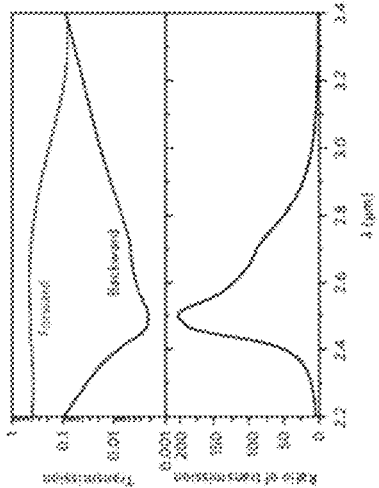
FIG. 7E illustrates optical power transmission spectra of the device in opposite propagation directions and the ratio of the spectra, showing that highly asymmetric optical power transmission is maintained over a broad wavelength range.

Asymmetric optical power transmission in waveguides: FIG. 7 shows a device that supports highly asymmetric optical power transmission around λ=2.5 μm when the fundamental TE waveguide mode is launched along opposite propagation directions. The gradient metasurface consists of 56 gold nanorods with different lengths located on the top surface of a Si3N4 waveguide (FIG. 7A). FIGS. 7B&C shows finite-difference time-domain simulations that depict mode evolutions in two opposite propagation directions. In the forward direction, the incident TE00 mode is converted into the TM10 mode (FIG. 7B). In the backward direction, it couples into surface waves, and optical power is strongly absorbed (FIG. 7C), with limited reflection back into the input port or optical scattering into free space and the substrate. The lower panel of FIG. 7D shows that optical power flow bends upwards and terminates at the antenna layer on the top surface of the waveguide. The transmission of optical power in the forward and backward directions is 42.9 and 0.21%, respectively, at λ=2.50 μm (FIG. 7E). The ratio of the transmission spectra of the two directions is maintained at a high level (>100) between λ=2.44 μm and 2.64 μm, and reaches its peak value of −'200 at λ=2.50 μm (FIG. 7E).

We developed a coupled-mode theory to model the highly asymmetric mode coupling in the device (Supplementary Section VIII). FIGS. 7F&G shows that our coupled-mode theory can accurately describe the mode evolution in both propagation directions. The most important feature of our theory that distinguishes it from conventional coupled-mode theory is that the coefficients that govern the coupling strength between two modes are different (for example, κ12≠κ21 for the coupling between the TE00 and TM10 modes and κ13≠κ31 for the coupling between the TE00 mode and surface waves). The physical reason for the asymmetric coupling coefficients is that the unidirectional phase gradient provided by the metasurface breaks the symmetry of optical power transfer between two modes. For example, a phase gradient dΦ/dx aligned with the light propagation direction will facilitate a higher-order waveguide mode to couple into a lower-order mode, but will inhibit the reverse process. Note that such directional waveguide mode coupling does not break time-reversal symmetry and is different from optical isolation. An optical isolator has an asymmetric scattering matrix that relates the incoming and outgoing modes at the ports connected to the device and can only be realized in systems with nonreciprocity, such as systems with magnetic materials, nonlinearity or temporal refractive index modulations 36. However, the performance of our devices is reciprocal. For example, if the TM10 mode is launched into the right port of the device in FIG. 2a, it will be converted with high efficiency into the TE00 mode exiting from the left port.

Figure 8B:
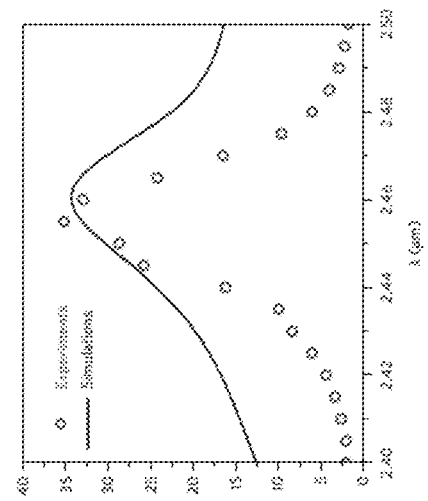
FIG. 8B provides SEM images of two gradient metasurface structures patterned on the top surfaces of the two Si3N4 waveguide branches of a device.
Figure 8A:
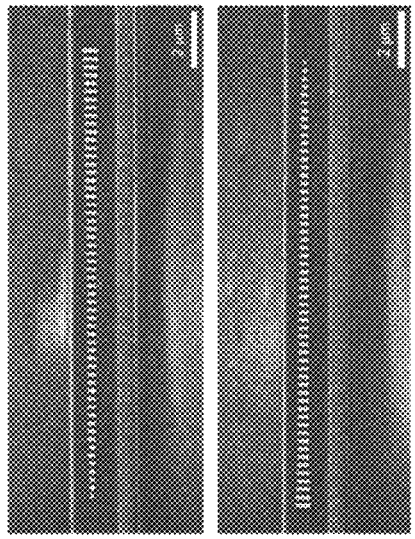
FIG. 8A provides schematic illustrations of exemplary fabricated devices consisting of a Y-branch waveguide and two gradient metasurfaces patterned on the waveguide branches.
Figure 8D:
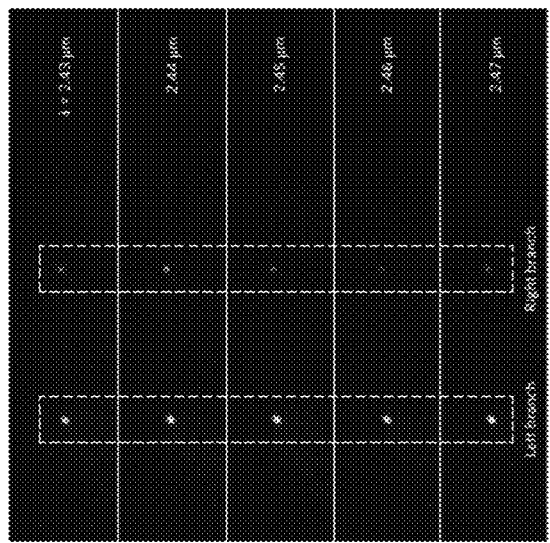
FIG. 8D provides plots of measured and simulated ratios of unpolarized peak light intensity at the two output ports.
Figure 8C:
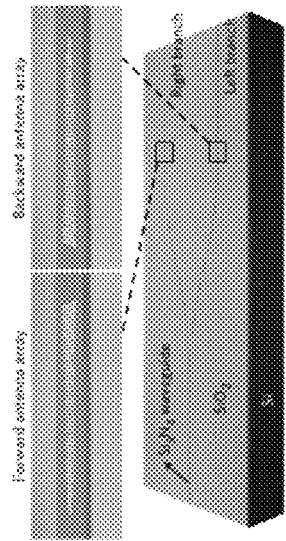
FIG. 8C provides infrared camera images of two output ports of a device at different wavelengths.

The devices for demonstrating asymmetric optical power flow in waveguides consist of a Y-branch waveguide and two gradient metasurface structures with opposite orientations (FIGS. 8A&B). Each gradient metasurface is positioned at the center of the top surface of one waveguide branch and consists of a phased array of gold nanorod antennas according to the design shown in FIG. 7A. In the experiment, an incident laser beam with tunable wavelengths between 2.40 and 2.50 μm and controllable polarization was coupled into the input port of the device using a single-mode mid-infrared fiber and predominantly excited the TE00 waveguide mode. An infrared camera was used to image the output ports of the two waveguide branches and the ratio of light transmission through the two ports were monitored as a function of wavelength. Without the gradient metasurfaces, the input light is separated equally between the two branches and the two optical spots at the output ports have the same intensity. However, in devices patterned with gradient metasurfaces, we observed a large difference in light transmission through the two ports (FIGS. 8C&D and Supplementary Section III). FIG. 8C shows images of the two optical spots at the output ports at different wavelengths ranging from 2.43 to 2.47 μm. In the right branch, light is efficiently converted into surface waves by the gradient metasurface and optical transmission is small. In the left branch, the incident TE00 mode is converted to the TM10 mode, which leads to large optical transmission. The ratio of the transmission spectra reaches its peak value of ~'35 around λ=2.45 μm (FIG. 8D).

Mode converters based on plasmonic metasurfaces: FIG. 9A shows a few waveguide mode converters operating around λ=4 μm. The gradient metasurfaces consist of phased arrays of gold nanorod antennas patterned on the top surface of silicon waveguides. The incident TE fundamental waveguide mode is converted into the TM00, TM10 or TE10 mode, depending on the design parameters, which include the phase gradient dΦ/dx, array length, offset of the antenna array from the waveguide center and antenna orientation. The third column in FIG. 4a shows finite-difference time-domain simulations of mode evolution when light propagates from the left to the right through a region of the waveguide patterned with the gradient metasurfaces.

The collective action of the antennas in a gradient metasurface can be quantified by N, the number of effective wavevectors, keff=dΦ/dx, imparted to the guided wave during the mode conversion process. The total additional wavevector needed for mode conversion is the difference of the propagation constants of the input and output waveguide modes, $\Delta\beta=k_o|n_{in}-n_{out}|$, where $k_o=2\pi/\lambda_o$ is the free-space wavevector, $n_{in}$ is the modal index of the input waveguide mode and $n_{out}$ is the modal index of the converted waveguide mode. N is therefore defined as N≡Δβ/|dΦ/dx|, and can be thought of as the number of interactions between the guided wave and the metasurface, where each interaction contributes dΦ/dx to the final propagation constant. For example, the modal index decreases from 2.717 to 1.609 in the TE00-to-TM10 mode convertor, where dΦ=5.7° and dx=500 nm, and so N is ~8.4. This large number of effective interactions between the guided wave and the metasurface occur over a propagation distance of 12 μm (the length of the antenna array), which is only ~2.9 times the free-space wavelength $\lambda_o$=4.16 μm. The power transmission of the mode converters is between 36 and 71%, and optical losses are mainly due to absorption in the gold nanoantennas. The purity of the converted modes can approach unity, and high-purity mode conversion can be maintained over a broad wavelength range. For example, the purity of the converted TM10 mode is above 90% within a wide wavelength range of λ=3.5-5.1 μm (FIG. 9B).

FIG. 10 shows the performance of a few waveguide mode converters fabricated according to the designs in FIG. 9A. We used a grating coupler to couple the output of a λ=4 μm quantum cascade laser into the fundamental TE waveguide mode, which then interacts with gradient metasurfaces patterned on the wave-guides and is converted into desired output waveguide modes. The converted modes exit from the cleaved facet at the end of the waveguides and radiate into the far-field. To characterize the converted modes, we measured their far-field profiles by raster-scanning a single-pixel indium antimonide detector in front of the waveguide output facet. FIG. 10B shows that the output from the TE00-to-TM00 mode converter (polarization rotator) has only one far-field lobe with TM polarization, and that the TE-polarized far-field is comparatively weak, indicating that the incident TE00 mode has been converted into the TM00 mode with high efficiency. The far-field profiles of the TE00-to-TM10 and TE00-to-TE10 mode converters have two lobes but are TM- and TE-polarized, respectively. The residual TE-polarized component in the far-field is negligible for the TE00-to-TM10 mode converter (FIG. 10D), which indicates complete mode conversion. The far-field of the TE00-to-TE10 mode converter (FIG. 10F) is non-ideal because of an imperfectly cleaved waveguide output facet.

Mode converters based on dielectric metasurfaces: The concept of gradient metasurfaces can be implemented in any materials systems that support optical resonances. In particular, gradient metasurfaces based on Mie resonators allow us to substantially decrease the optical absorption associated with optical resonances and thereby reduce the insertion losses of waveguide mode converters. FIG. 11A shows a few such all-dielectric mode converters operating around the telecommunications wavelength of λ=1.55 μm. The devices consist of silicon nanorods with different lengths located on the top surface of LiNbO3 waveguides. We engineered the dipolar Mie resonances supported by the silicon nanorods so that the incremental phase between adjacent elements is a constant.

FIGS. 11B-11D presents scanning electron microscopy (SEM) images of a fabricated telecom TE00-to-TM00 mode converter according to the design shown in FIG. 11A. The TE fundamental wave-guide mode with tunable wavelengths between 1,480 and 1,580 nm was launched into the TE00-to-TM00 mode converters as well as into bare waveguides with the same length and cross-sectional dimensions as the mode converters. We observed no significant difference between the mode converters and the bare waveguides in their transmitted optical power, implying that the dielectric metasurfaces introduce negligible insertion losses. For example, the measured transmitted optical signal from an InGaAs photodetector for the TE00-to-TM00 mode converters averaged over six devices is 1.09±0.14 V, while the measured transmitted optical signal of 10 bare waveguides is 1.07±0.19 V.

Figure 11E:
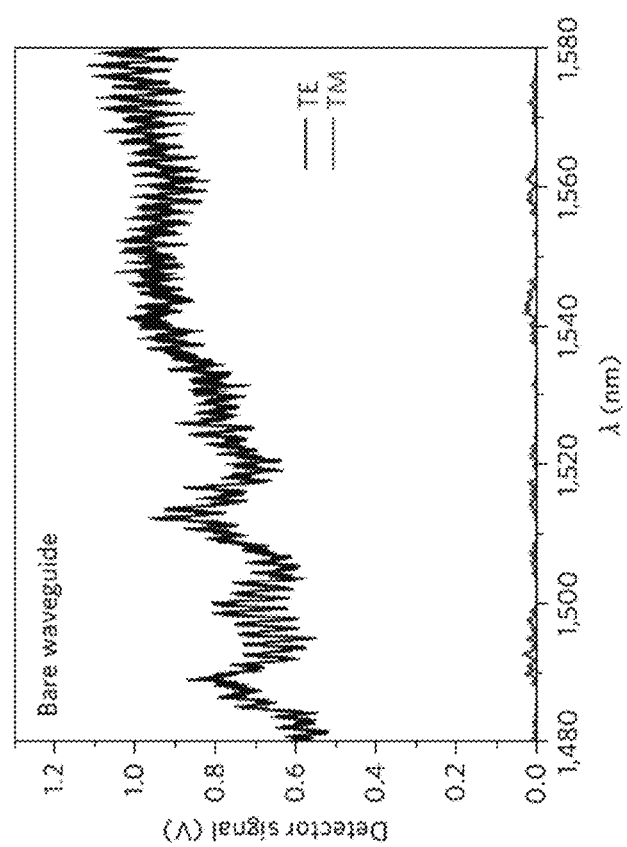
FIG. 11E provides a plot of TE- and TM-polarized components' detector signal measured at the output port of a bare waveguide that has the same geometries (length and cross-sectional dimensions) as the TE00-to-$TM_{00}$ mode converters.
Figure 12A:
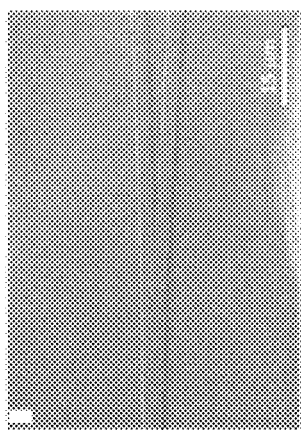
FIG. 12A provides a SEM image of tapered waveguide close to the input port.
Figure 12C:
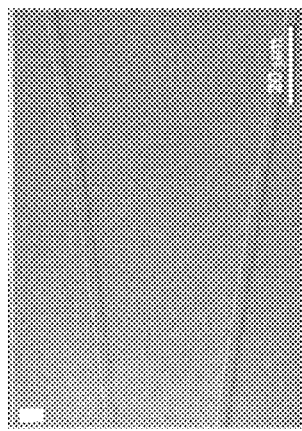
FIG. 12C provides a SEM image of perspective view of the Y-junction.
Figure 12E:
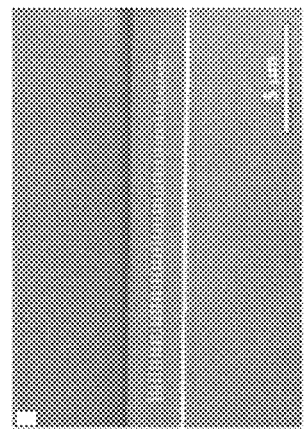
FIG. 12E provides a SEM image of phased antenna arrays patterned on the two branches in forwarded deration.
Figure 12B:
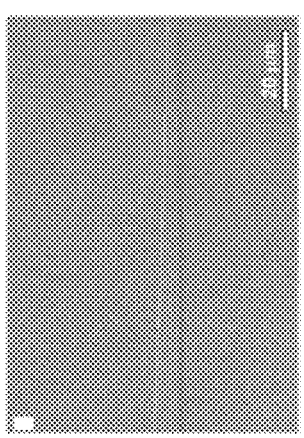
FIG. 12B provides a SEM image of top view of the Y-junction.
Figure 12D:
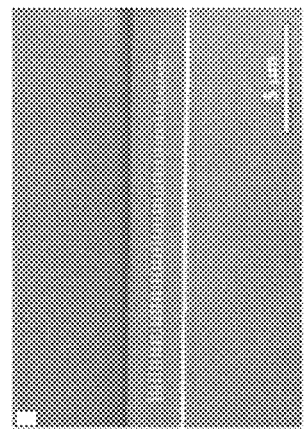
FIG. 12D provides a SEM image of two branches from the Y-junction.
Figure 12F:
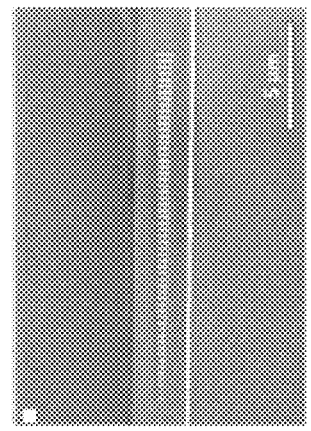
FIG. 12F provides a SEM image of phased antenna arrays patterned on the two branches in backward deration.

In addition, these waveguide mode converters have broadband performance. FIGS. 11E and F presents measured spectra of the TE- and TM-polarized components of a bare waveguide and of a TE00-to-TM00 mode converter, respectively. The measured TE and TM components must be contributed by the TE00 and TM00 waveguide modes, respectively, because the LiNbO3 waveguides are designed to only support the fundamental TE and TM modes. Thus, the spectra in FIG. 11E indicate that the TE00 mode is coupled into a bare waveguide and propagates along the entire length of the waveguide (2 mm), while maintaining high modal purity (>99%), and the spectra in FIG. 11F indicate that when the dielectric gradient metasurface is patterned on the waveguide, the TE00 mode launched into the device is converted into a high-purity TM00 mode (with a purity of 96% averaged over λ=1,480-1,580 nm).

Conclusions: The integration of metasurface structures into photonic integrated circuits provides a highly efficient platform for the control of guided waves over broadband and with low losses. In this hybrid platform, control of waveguide modes is realized by light scattering by phased arrays of nanoantennas, where the distance between neighboring antennas is a few times smaller than the wavelength. Optical scattering at subwavelength intervals provides the most efficient control of guided waves among all device configurations. As such, photonic integrated devices based on metasurfaces could have a footprint much smaller than conventional devices based on ridge waveguides (where control of light is through light propagation and coupling via weak evanescent waves) and those based on photonic crystals (where control of light is through scattering at intervals comparable to the wavelength). The compact footprint of metasurface-based photonic integrated devices could enable a higher level of device integration and a broader device operation wavelength range. In fact, the mode converters we have shown can have lengths as short as 1.7 times the free-space wavelength (for example, the mid-infrared TE00-to-TE10 mode converter and TE00-to-TM00 polarization rotator in FIG. 10) and can maintain high-purity mode conversion over a wavelength range as large as 35% of the central operating wavelength (FIG. 9B). Such properties are not achievable in previously demonstrated devices (for example, those based on photonic crystals, directional couplers, mirroring resonators, multichannel branching waveguides, Mach-Zehnder interferometers and structured waveguides, which typically have dimensions ranging from a few times to a few hundred times the free-space wavelength and work over a wavelength range less than a few percent of the central operating wavelength.

We envision that the functionalities demonstrated in this Article will be useful for a number of device and system applications. For example, waveguide mode conversion can be used in mode-division and polarization-division multiplexing, which can increase the capacity of optical communication channels. The conversion from waveguide modes to surface waves can be used to create broadband integrated perfect absorbers, on-chip biochemical sensors and small-footprint integrated photodetectors based on internal photoemission of hot electrons. Furthermore, the unidirectional wavevector introduced by the gradient metasurfaces could be used to break the symmetry of coupling between optical pumps and generated nonlinear optical signals and thus help relax the phase-matching requirement in on-chip nonlinear wavelength conversion.

In addition to the various embodiments depicted and claimed, the disclosed subject matter is also directed to other embodiments having other combinations of the features disclosed and claimed herein. As such, the particular features presented herein can be combined with each other in other manners within the scope of the disclosed subject matter such that the disclosed subject matter includes any suitable combination of the features disclosed herein. The foregoing description of specific embodiments of the disclosed subject matter has been presented for purposes of illustration and description. It is not intended to be exhaustive or to limit the disclosed subject matter to those embodiments disclosed.

It will be apparent to those skilled in the art that various modifications and variations can be made in the systems and methods of the disclosed subject matter without departing from the spirit or scope of the disclosed subject matter. Thus, it is intended that the disclosed subject matter include modifications and variations that are within the scope of the appended claims and their equivalents.

What is claimed is:

1. A surveillance system for detecting a change in at least one physical parameter of a target illuminated by electromagnetic radiation, comprising:
   one or more optical fibers, each having a plurality of sensor nodes thereon, wherein the plurality of sensor nodes includes a plurality of optical nano-antennas;
   an optical fiber switch, adapted to transmit at least a portion of the electromagnetic radiation into the one or more optical fibers, wherein each of the plurality of sensor nodes is configured to induce an interaction between the change in the at least one physical parameter and the transmitted electromagnetic radiation to thereby generate an optical signal; and
   a photo detector, coupled to the one or more optical fibers, adapted to measure the optical signal.

2. The surveillance system of claim 1, wherein each of the optical nano-antennas is configured to:
   draw the transmitted electromagnetic radiation to a surface of each of the one or more optical fibers to generate a surface electromagnetic wave to interact with the target; and
   scatter the surface electromagnetic wave into a corresponding one of the one or more optical fibers to form the optical signal.

3. The surveillance system of claim 1, wherein the interaction is induced by selecting one or more of a size, a length, and/or an orientation of the plurality of optical nano-antennas.

4. The surveillance system of claim 1, further comprising a communications channel, coupled to the photo detector, adapted to communicate the optical signal to one or more devices.

5. The surveillance system of claim 1, further comprising a device, communicatively coupled to the photo detector, and adapted to receive the optical signal and identify at least a location of the target based thereon.

6. The surveillance system of claim 1, wherein the electromagnetic radiation is selected from the group consisting of a radio wave, a microwave, infrared radiation, light, ultraviolet radiation, and laser radiation.

7. The surveillance system of claim 1, wherein the change in the at least one physical parameter is selected from the group consisting of a water leak, a gas leak, a change of temperature, and a change of mechanical stress.

8. The surveillance system of claim 1, wherein the plurality of sensor nodes is selected from the group consisting of a tapered optical fiber, an optical fiber having one or more notches, an optical fiber having a gap of a size, an optical fiber integrated with the optical nano-antennas, and a locally doped optical fiber.

9. The surveillance system of claim 8, wherein the surveillance system has a sensitivity corresponding to a number of the one or more of a number of notches, a size of the gap, a configuration of the optical nano-antennas, and/or dopants selected for the locally doped optical fiber.

10. A method for detecting a change in at least one physical parameter of a target illuminated by electromagnetic radiation, comprising:
    embedding one or more optical fibers, each having a plurality of sensor nodes, in an architecture, wherein the plurality of sensor nodes includes a plurality of optical nano-antennas;
    transmitting the electromagnetic radiation into the one or more optical fibers, wherein each of the plurality of sensor nodes is configured to induce an interaction between the change in the at least one physical parameter and the transmitted electromagnetic radiation thereby generate an optical signal; and detecting the optical signal.

11. The method of claim 10, further comprising communicating the optical signal.

12. The method of claim 10, further comprising determining a location of the target by tracing the optical signal.

13. The method of claim 10, further comprising modifying a distribution of the plurality of sensor nodes to facilitate tracing the optical signal.

14. The method of claim 10, wherein the change in the at least one physical parameter is selected from the group consisting of a water leak, a gas leak, a change of temperature, and a change of mechanical stress.

15. The method of claim 10, wherein the architecture is selected from the group consisting of a roof, a road, a bridge, a ceiling, and a wall.

16. The method of claim 10, wherein an emission bandwidth of the electromagnetic radiation matches with an absorption bandwidth of the change in the at least one physical parameter.

17. The method of claim 10, wherein the plurality of sensor nodes alters the transmitted electromagnetic radiation responsive to the interaction by inducing an optical decay and/or a temporal optical power change of the transmitted electromagnetic radiation.

* * * * *